(12) United States Patent (10) Patent No.: US 7,772,774 B1
Pavliscak et al. (45) Date of Patent: Aug. 10, 2010

(54) POSITIVE COLUMN PLASMA DISPLAY TUBULAR DEVICE

(75) Inventors: Thomas J. Pavliscak, Palos Verdes Estates, CA (US); Carol Ann Wedding, Toledo, OH (US)

(73) Assignee: Imaging Systems Technology, Toledo, OH (US)

( * ) Notice: Subject to any disclaimer, the term of this patent is extended or adjusted under 35 U.S.C. 154(b) by 287 days.

(21) Appl. No.: 11/672,557

(22) Filed: Feb. 8, 2007

Related U.S. Application Data

(60) Continuation-in-part of application No. 11/132,366, filed on May 19, 2005, now Pat. No. 7,176,628, which is a division of application No. 10/441,104, and a continuation-in-part of application No. 10/441,104, filed on May 20, 2003, now Pat. No. 7,157,854.

(60) Provisional application No. 60/381,823, filed on May 21, 2002.

(51) Int. Cl.
 *H01J 17/49* (2006.01)
(52) U.S. Cl. .......................... 313/582; 313/584
(58) Field of Classification Search ......... 313/582–587, 313/504–506; 345/60; 445/23–25
See application file for complete search history.

(56) References Cited

U.S. PATENT DOCUMENTS

| | | | |
|---|---|---|---|
| 2,644,113 A | 6/1953 | Etzkorn |
| 3,050,654 A | 8/1962 | Toulon |
| 3,602,754 A | 8/1971 | Pfaender et al. |
| 3,646,384 A | 2/1972 | Lay |
| 3,652,891 A | 3/1972 | Janning |
| 3,654,680 A | 4/1972 | Bode et al. |
| 3,666,981 A | 5/1972 | Lay |
| 3,701,184 A | 10/1972 | Grier |
| 3,836,810 A | 7/1973 | Johanns et al |
| 3,769,543 A | 10/1973 | Pennebaker |
| 3,811,061 A | 5/1974 | Nakayama et al. |
| 3,848,248 A | 11/1974 | MacIntyre |
| 3,860,846 A | 1/1975 | Mayer |
| 3,885,195 A | 5/1975 | Amano |
| 3,927,342 A | 12/1975 | Bode et al. |
| 3,935,494 A | 1/1976 | Dick et al. |
| 3,964,050 A | 6/1976 | Mayer |
| 3,969,718 A | 7/1976 | Strom |
| 3,990,068 A | 11/1976 | Mayer et al. |
| 3,998,618 A | 12/1976 | Kreik et al. |
| 4,027,188 A | 5/1977 | Bergman |
| 4,035,690 A | 7/1977 | Roeber |
| 4,038,577 A | 7/1977 | Bode et al. |
| 4,060,749 A | 11/1977 | Shinada et al. |
| 4,063,131 A | 12/1977 | Miller |
| 4,087,805 A | 5/1978 | Miller |
| 4,087,807 A | 5/1978 | Miavecz |

(Continued)

*Primary Examiner*—Joseph L Williams
(74) *Attorney, Agent, or Firm*—Donald K. Wedding

(57) ABSTRACT

A positive column gas discharge plasma display device comprising one or more ionizable gas filled elongated Plasma-tubes. The display may be a dual substrate or a single substrate device. One or more substrates may be of a flexible material. The device comprises a multiplicity of parallel elongated hollow tubes filled with an ionizable gas. Each tube has at least one column electrode extended along its elongated axis with an array of row electrodes orthogonal to the column electrode. The row electrodes are arranged in pairs with an isolation bar between each pair to prevent spreading of the gas discharge.

10 Claims, 13 Drawing Sheets

U.S. PATENT DOCUMENTS

| | | |
|---|---|---|
| 4,106,009 A | 8/1978 | Dick |
| 4,126,807 A | 11/1978 | Wedding et al. |
| 4,126,809 A | 11/1978 | Wedding et al. |
| 4,164,678 A | 8/1979 | Biazzo et al. |
| 4,233,623 A | 11/1980 | Pavliscak |
| 4,303,732 A | 12/1981 | Torobin |
| 4,320,418 A | 3/1982 | Pavliscak |
| 4,349,456 A | 9/1982 | Sowman |
| 4,494,038 A | 1/1985 | Wedding et al. |
| 4,638,218 A | 1/1987 | Shinoda et al. |
| 4,737,687 A | 4/1988 | Shinoda et al. |
| 4,963,792 A | 10/1990 | Parker |
| 5,326,298 A | 7/1994 | Hotomi |
| 5,793,158 A | 8/1998 | Wedding |
| 5,984,747 A | 11/1999 | Bhagavatula et al. |
| 6,184,848 B1 | 2/2001 | Weber |
| 6,255,777 B1 | 7/2001 | Kim et al. |
| 6,376,995 B1 | 4/2002 | Kato et al. |
| 6,528,952 B2 | 3/2003 | Kato et al. |
| 6,545,422 B1 | 4/2003 | George et al. |
| 6,570,335 B1 | 5/2003 | George et al. |
| 6,612,889 B1 | 9/2003 | Green et al. |
| 6,620,012 B1 | 9/2003 | Johnson et al. |
| 6,633,117 B2 | 10/2003 | Shinoda et al. |
| 6,646,388 B2 | 11/2003 | George et al. |
| 6,650,055 B2 | 11/2003 | Ishimoto et al. |
| 6,677,704 B2 | 1/2004 | Ishimoto et al. |
| 6,693,389 B2 | 2/2004 | Marcotte et al. |
| 6,762,566 B1 | 7/2004 | George et al. |
| 6,764,367 B2 | 7/2004 | Green et al. |
| 6,768,478 B1 | 7/2004 | Wani et al. |
| 6,791,264 B2 | 9/2004 | Green et al. |
| 6,794,812 B2 | 9/2004 | Yamada et al. |
| 6,796,867 B2 | 9/2004 | George et al. |
| 6,801,001 B2 | 10/2004 | Drobot et al. |
| 6,822,626 B2 | 11/2004 | George et al. |
| 6,836,063 B2 | 12/2004 | Ishimoto et al. |
| 6,836,064 B2 | 12/2004 | Yamada et al. |
| 6,841,929 B2 | 1/2005 | Ishimoto et al. |
| 6,853,144 B2 | 2/2005 | Marcotte |
| 6,857,923 B2 | 2/2005 | Yamada et al. |
| 6,864,631 B1 | 3/2005 | Wedding |
| 6,893,677 B2 | 5/2005 | Yamada et al. |
| 6,902,456 B2 | 6/2005 | George et al. |
| 6,914,382 B2 | 7/2005 | Ishimoto et al. |
| 6,930,442 B2 | 8/2005 | Awamoto et al. |
| 6,932,664 B2 | 8/2005 | Yamada et al. |
| 6,935,913 B2 | 8/2005 | Wyeth et al. |
| 6,969,292 B2 | 11/2005 | Tokai et al. |
| 6,975,068 B2 | 12/2005 | Green et al. |
| 7,005,793 B2 | 2/2006 | George et al. |
| 7,025,648 B2 | 4/2006 | Green et al. |
| 7,049,748 B2 | 5/2006 | Tokai et al. |
| 7,083,681 B2 | 8/2006 | Yamada et al. |
| 7,122,961 B1 | 10/2006 | Wedding |
| 7,125,305 B2 | 10/2006 | Green et al. |
| 7,137,857 B2 | 11/2006 | George et al. |
| 7,140,941 B2 | 11/2006 | Green et al. |
| 7,157,854 B1 | 1/2007 | Wedding |
| 7,176,628 B1 | 2/2007 | Wedding |
| 7,247,989 B1 | 7/2007 | Wedding |
| 7,307,602 B1 | 12/2007 | Wedding et al. |
| 7,375,342 B1 | 5/2008 | Wedding |
| 7,405,516 B1 | 7/2008 | Wedding |
| 7,456,571 B1 | 11/2008 | Wedding |
| 7,456,808 B1 | 11/2008 | Wedding et al. |
| 7,474,273 B1 | 1/2009 | Pavliscak et al. |
| 7,518,576 B1 | 4/2009 | Rutherford |
| 7,535,175 B1 | 5/2009 | Strbik, III et al. |
| 7,589,697 B1 | 9/2009 | Guy et al. |
| 7,595,774 B1 | 9/2009 | Wedding et al. |
| 7,604,523 B1 | 10/2009 | Wedding et al. |
| 7,619,591 B1 | 11/2009 | Guy et al. |
| 7,622,866 B1 | 11/2009 | Wedding et al. |
| 7,628,666 B1 | 12/2009 | Strbik, III et al. |
| 7,638,943 B1 | 12/2009 | Wedding et al. |
| 2001/0028216 A1 | 10/2001 | Tokai et al. |
| 2003/0182967 A1 | 10/2003 | Tokai et al. |
| 2004/0033319 A1 | 2/2004 | Yamada et al. |
| 2004/0063373 A1 | 4/2004 | Johnson et al. |
| 2005/0095944 A1 | 5/2005 | George et al. |
| 2006/0097620 A1 | 5/2006 | George et al. |
| 2007/0015431 A1 | 1/2007 | Green et al. |

Section A-A View

Section A-A View

Section A-A View

Section A-A View

Figure 6A

| Electrical Map | | Data Electrodes | | | | | | | | | | |
|---|---|---|---|---|---|---|---|---|---|---|---|---|
| | | I1 | I2 | I3 | I4 | I5 | I6 | I7 | I8 | I9 | | |
| | | m1 | m2 | m3 | m4 | m5 | m6 | m7 | m8 | m9 | | |
| Address Electrodes (can electrodes) | n1 | n1,I1 | n1,I2 | n1,I3 | n1,I4 | n1,I5 | n1,I6 | n1,I7 | n1,I8 | n1,I9 | R1 | Rows |
| | n2 | n2,I1 | n2,I2 | n2,I3 | n2,I4 | n2,I5 | n2,I6 | n2,I7 | n2,I8 | n2,I9 | R2 | |
| | n3 | n3,I1 | n3,I2 | n3,I3 | n3,I4 | n3,I5 | n3,I6 | n3,I7 | n3,I8 | n3,I9 | R3 | |
| | n4 | n4,I1 | n4,I2 | n4,I3 | n4,I4 | n4,I5 | n4,I6 | n4,I7 | n4,I8 | n4,I9 | R4 | |
| | n5 | n5,m1 | n5,m2 | n5,m3 | n5,m4 | n5,m5 | n5,m6 | n5,m7 | n5,m8 | n5,m9 | R5 | |
| | n6 | n6,m1 | n6,m2 | n6,m3 | n6,m4 | n6,m5 | n6,m6 | n6,m7 | n6,m8 | n6,m9 | R6 | |
| | n7 | n7,m1 | n7,m2 | n7,m3 | n7,m4 | n7,m5 | n7,m6 | n7,m7 | n7,m8 | n7,m9 | R7 | |
| | n8 | n8,m1 | n8,m2 | n8,m3 | n8,m4 | n8,m5 | n8,m6 | n8,m7 | n8,m8 | n8,m9 | R8 | |
| | | C1 | C2 | C3 | C4 | C5 | C6 | C7 | C8 | C9 | | |
| | | Column | | | | | | | | | Physical Map | |

| Scan | Physical Map | | | | | | | | |
|---|---|---|---|---|---|---|---|---|---|
| 1 | R1,C1 | R1,C2 | R1,C3 | R1,C4 | R1,C5 | R1,C6 | R1,C7 | R1,C8 | R1,C9 |
| | R5,C1 | R5,C2 | R5,C3 | R5,C4 | R5,C5 | R5,C6 | R5,C7 | R5,C8 | R5,C9 |
| 2 | R2,C1 | R2,C2 | R2,C3 | R2,C4 | R2,C5 | R2,C6 | R2,C7 | R2,C8 | R2,C9 |
| | R6,C1 | R6,C2 | R6,C3 | R6,C4 | R6,C5 | R6,C6 | R6,C7 | R6,C8 | R6,C9 |

| Electrical Map | | Data Electrodes | | | | | | | | | | |
|---|---|---|---|---|---|---|---|---|---|---|---|---|
| | | m1 | m2 | m3 | m4 | m5 | m6 | m7 | m8 | m9 | | |
| Address Electrodes (can electrodes) | n1 | n1,m1 | n3,m2 | n1,m3 | n3,m4 | n1,m5 | n3,m6 | n1,m7 | n3,m8 | n1,m9 | R1 | Rows |
| | n2 | n2,m1 | n4,m2 | n2,m3 | n4,m4 | n2,m5 | n4,m6 | n2,m7 | n4,m8 | n2,m9 | R2 | |
| | n3 | n3,m1 | n1,m2 | n3,m3 | n1,m4 | n3,m5 | n1,m6 | n3,m7 | n1,m8 | n3,m9 | R3 | |
| | n4 | n4,m1 | n2,m2 | n4,m3 | n2,m3 | n4,m5 | n2,m6 | n4,m7 | n2,m8 | n4,m9 | R4 | |
| | n5 | n5,m1 | n7,m2 | n5,m3 | n7,m4 | n5,m5 | n7,m6 | n5,m7 | n7,m8 | n5,m9 | R5 | |
| | n6 | n6,m1 | n8,m2 | n6,m3 | n8,m4 | n6,m5 | n8,m6 | n6,m7 | n8,m8 | n6,m9 | R6 | |
| | n7 | n7,m1 | n5,m2 | n7,m3 | n5,m4 | n7,m5 | n5,m6 | n7,m7 | n5,m8 | n7,m9 | R7 | |
| | n8 | n8,m1 | n6,m2 | n8,m3 | n6,m3 | n8,m5 | n6,m6 | n8,m7 | n6,m8 | n8,m9 | R8 | |
| | | C1 | C2 | C3 | C4 | C5 | C6 | C7 | C8 | C9 | | |
| | | Column | | | | | | | | | Physical Map | |

| Scan | Physical Map | | | | | | | | |
|---|---|---|---|---|---|---|---|---|---|
| 1 | R1,C1 | R3,C2 | R1,C3 | R3,C4 | R1,C5 | R3,C6 | R1,C7 | R3,C8 | R1,C9 |
| 2 | R2,C1 | R4,C2 | R2,C3 | R4,C4 | R2,C5 | R4,C6 | R2,C7 | R4,C8 | R2,C9 |
| 3 | R3,C1 | R1,C2 | R3,C3 | R1,C4 | R3,C5 | R1,C6 | R3,C7 | R1,C8 | R3,C9 |
| 4 | R4,C1 | R2,C2 | R4,C3 | R2,C4 | R4,C5 | R2,C6 | R4,C7 | R2,C8 | R4,C9 |

Figure 6B

| Electrical Map | Data Electrodes | | | | | | | | | | |
|---|---|---|---|---|---|---|---|---|---|---|---|
| | m1 | m2 | m3 | m4 | m5 | m6 | m7 | m8 | m9 | | |
| n1 | n1,m1 | n4,m2 | n3,m3 | n2,m4 | n1,m5 | n4,m6 | n3,m7 | n2,m8 | n1,m9 | R1 | Row |
| n2 | n2,m1 | n1,m2 | n4,m3 | n3,m4 | n2,m5 | n1,m6 | n4,m7 | n3,m8 | n2,m9 | R2 | |
| n3 | n3,m1 | n2,m2 | n1,m3 | n4,m4 | n3,m5 | n2,m6 | n1,m7 | n4,m8 | n3,m9 | R3 | |
| n4 | n4,m1 | n3,m2 | n2,m3 | n1,m4 | n4,m5 | n3,m6 | n2,m7 | n1,m8 | n4,m9 | R4 | |
| n5 | n5,m1 | n8,m2 | n7,m3 | n6,m4 | n5,m5 | n8,m6 | n7,m7 | n6,m8 | n5,m9 | R5 | |
| n6 | n6,m1 | n5,m2 | n8,m3 | n7,m4 | n6,m5 | n5,m6 | n8,m7 | n7,m8 | n6,m9 | R6 | |
| n7 | n7,m1 | n6,m2 | n5,m3 | n8,m4 | n7,m5 | n6,m6 | n5,m7 | n8,m8 | n7,m9 | R7 | |
| n8 | n8,m1 | n7,m2 | n6,m3 | n5,m4 | n8,m5 | n7,m6 | n6,m7 | n5,m8 | n8,m9 | R8 | |
| | C1 | C2 | C3 | C4 | C5 | C6 | C7 | C8 | C9 | | |
| | Column | | | | | | | | | Physical Map | |

| Scan | Physical Map | | | | | | | | |
|---|---|---|---|---|---|---|---|---|---|
| 1 | R1,C1 | R2,C2 | R3,C3 | R4,C4 | R1,C5 | R2,C6 | R3,C7 | R4,C8 | R1,C9 |
| 2 | R2,C1 | R3,C2 | R4,C3 | R1,C4 | R2,C5 | R3,C6 | R4,C7 | R1,C8 | R2,C9 |
| 3 | R3,C1 | R4,C2 | R1,C3 | R2,C4 | R3,C5 | R4,C6 | R1,C7 | R2,C8 | R3,C9 |
| 4 | R4,C1 | R1,C2 | R2,C3 | R3,C4 | R4,C5 | R1,C6 | R2,C7 | R3,C8 | R4,C9 |

Figure 6C

POSITIVE COLUMN PLASMA DISPLAY TUBULAR DEVICE

RELATED PATENT APPLICATIONS

This is a continuation-in-part (CIP) under 35 USC 120 of U.S. patent application Publication Ser. No. 11/132,366, filed May 19, 2005 now U.S. Pat. No. 7,176,628, which is a division and continuation-in-part (CIP) under 35 USC 120 of U.S. patent application Publication Ser. No. 10/441,104, filed May 20, 2003, now U.S. Pat. No. 7,157,854 which claims priority under 35 USC 119(e) of Provisional Patent Application 60/381,823 filed May 21, 2002.

FIELD OF THE INVENTION

This invention relates to a positive column gas discharge plasma display device using elongated Plasma-tubes and a process for production of the same. The PDP comprises one or more Plasma-tubes on or within a rigid or flexible substrate with each Plasma-tube being electrically connected to at least two electrical conductors such as electrodes. The hollow Plasma-tube is filled with an ionizable gas and used as a pixel or subpixel in a gas discharge plasma display panel (PDP) device. This invention is particularly suitable for single substrate structures and for flexible or bendable displays.

The Plasma-tube may be used alone or in combination with one or more Plasma-shells. As used herein, Plasma-shell includes Plasma-disc, Plasma-dome, and Plasma-sphere. A Plasma-tube differs from a Plasma-shell by containing multiple gas discharge cells or pixels.

BACKGROUND OF THE INVENTION

PDP Structures and Operation

A gas discharge plasma display panel (PDP) comprises a multiplicity of single addressable picture elements, each element referred to as a pixel or cell. The electrodes are generally grouped in a matrix configuration to allow for selective addressing of each pixel or cell. In a multicolor PDP, two or more pixels or cells may be addressed as subpixels or sub-cells to form a single pixel or cell. As used herein, pixel or cell means subpixel or sub-cell. The pixel or cell element is defined by two or more electrodes positioned in such a way so as to provide a voltage potential across a gap containing an ionizable gas. When sufficient voltage is applied across the gap, the gas ionizes to produce light. In an AC gas discharge plasma display, the electrodes at a pixel site are insulated from the gas with a dielectric. In a DC gas discharge one or more of the electrodes is in contact with the gas.

Several types of voltage pulses may be applied across a plasma display cell gap to form a display image. These pulses include a write pulse, a sustain pulse, and an erase pulse. The write pulse is of a sufficient voltage potential to ionize the gas at the pixel site and is selectively applied across selected pixel sites. The ionized gas will produce visible light and/or invisible light such as UV, which excites a phosphor to glow. In an AC gas discharge, sustain pulses are a series of pulses that produce a voltage potential across pixels to maintain ionization of pixels previously ionized. An erase pulse is used to selectively extinguish ionized pixels.

The voltage at which a pixel will ionize, sustain, and erase depends on a number of factors including the distance between the electrodes, the composition of the ionizing gas, and the pressure of the ionizing gas. Also of importance is the dielectric composition and thickness. To maintain uniform electrical characteristics throughout the display, it is desired that the various physical parameters adhere to required tolerances. Maintaining the required tolerance depends on display structure, cell geometry, fabrication methods, and the materials used. The prior art discloses a variety of plasma display structures, cell geometries, methods of construction, and materials.

AC PDP

AC gas discharge devices include both monochrome (single color) AC plasma displays and multicolor (two or more colors) AC plasma displays. Examples of monochrome AC gas discharge (plasma) displays are well known in the prior art and include those disclosed in U.S. Pat. Nos. 3,559,190 (Bitzer et al.), 3,499,167 (Baker et al.), 3,860,846 (Mayer), 3,964,050 (Mayer), 4,080,597 (Mayer), 3,646,384 (Lay), and 4,126,807 (Wedding), all incorporated herein by reference. Examples of multicolor AC plasma displays are well known in the prior art and include those disclosed in U.S. Pat. Nos. 4,233,623 (Pavliscak), 4,320,418 (Pavliscak), 4,827,186 (Knauer et al.), 5,661,500 (Shinoda et al.), 5,674,553 (Shinoda et al.), 5,107,182 (Sano et al.), 5,182,489 (Sano), 5,075,597 (Salavin et al.), 5,742,122 (Amemiya, et al.), 5,640,068 (Amemiya et al.), 5,736,815 (Amemiya), 5,541,479 (Nagakubi), 5,745,086 (Weber), and 5,793,158 (Wedding), all incorporated herein by reference.

This invention described herein refers to an AC plasma display. The PDP industry has used two different AC plasma display panel (PDP) structures, the two-electrode AC columnar discharge structure and the three-electrode AC surface discharge structure. Columnar discharge is also called co-planar discharge.

Columnar AC PDP

The two-electrode columnar or co-planar discharge plasma display structure is disclosed in U.S. Pat. Nos. 3,499,167 (Baker et al.) and 3,559,190 (Bitzer et al.) The two-electrode columnar discharge structure is also referred to as opposing electrode discharge, twin substrate discharge, or co-planar discharge. In the two-electrode columnar discharge AC plasma display structure, the sustaining voltage is applied between an electrode on a rear or bottom substrate and an opposite electrode on the front or top viewing substrate. The gas discharge takes place between the two opposing electrodes in between the top viewing substrate and the bottom substrate.

The columnar discharge PDP structure has been widely used in monochrome AC plasma displays that emit orange or red light from a neon gas discharge. Phosphors may be used in a monochrome structure to obtain a color other than neon orange.

In a multicolor columnar discharge PDP structure as disclosed in U.S. Pat. No. 5,793,158 (Wedding), phosphor stripes, or layers are deposited along the barrier walls and/or on the bottom substrate adjacent to and extending in the same direction as the bottom electrode. The discharge between the two opposite electrodes generates electrons and ions that bombard and deteriorate the phosphor thereby shortening the life of the phosphor and the PDP.

In a two electrode columnar discharge PDP as disclosed by Wedding (158), each light emitting pixel is defined by a gas discharge between a bottom or rear electrode x and a top or front opposite electrode y, each cross-over of the two opposing arrays of bottom electrodes x and top electrodes y defining a pixel or cell.

Surface Discharge AC PDP

The three-electrode multicolor surface discharge AC plasma display panel structure is widely disclosed in the prior art including U.S. Pat. Nos. 5,661,500 (Shinoda et al.), 5,674,553, (Shinoda et al.), 5,745,086 (Weber), and 5,736,815 (Amemiya), all incorporated herein by reference.

In a surface discharge PDP, each light emitting pixel or cell is defined by the gas discharge between two electrodes on the top substrate. In a multicolor RGB display, the pixels may be called subpixels or sub-cells. Photons from the discharge of an ionizable gas at each pixel or subpixel excite a photoluminescent phosphor that emits red, blue, or green light.

In a three-electrode surface discharge AC plasma display, a sustaining voltage is applied between a pair of adjacent parallel electrodes that are on the front or top viewing substrate. These parallel electrodes are called the bulk sustain electrode and the row scan electrode. The row scan electrode is also referred to as a row sustain electrode because it functions to address and sustain. The opposing electrode on the rear or bottom substrate is a column data electrode and is used to periodically address a row scan electrode on the top substrate. The sustaining voltage is applied to the bulk sustain and row scan electrodes on the top substrate. The gas discharge takes place between the row scan and bulk sustain electrodes on the top viewing substrate.

In a three-electrode surface discharge AC plasma display panel, the sustaining voltage and resulting gas discharge occurs between the electrode pairs on the top or front viewing substrate above and secluded from the phosphor on the bottom substrate. This separation of the discharge from the phosphor minimizes electron bombardment and deterioration of the phosphor deposited on the walls of the barriers or in the grooves (or channels) on the bottom substrate adjacent to and/or over the third (data) electrode.

DC PDP

This invention may be practiced in a DC gas discharge (plasma) display which is well known in the prior art, for example as disclosed in U.S. Pat. Nos. 3,788,722 (Milgram), 3,886,390 (Maloney et al.), 3,886,404 (Kurahashi et al.), 4,035,689 (Ogle et al.), 4,297,613 (Aboelfotoh), 4,329,626 (Hillenbrand et al.), 4,340,840 (Aboelfotoh et al.), 4,532,505 (Holz et al.), 5,233,272 (Whang et al.), 6,069,450 (Sakai et al.), 6,160,348 (Choi), and 6,428,377 (Choi), all incorporated herein by reference.

Single Substrate PDP

There may be used an AC or DC PDP structure having a single substrate or monolithic plasma display panel structure having one substrate with or without a top or front viewing envelope or dome. Single-substrate or monolithic plasma display panel structures are well known in the prior art and are disclosed by U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all incorporated herein by reference.

Plasma-tubes

Plasma-tubes comprise elongate tubes for example as disclosed in U.S. Pat. Nos. 3,602,754 (Pfaender et al.), 3,654,680 (Bode et al.), 3,927,342 (Bode et al.), 4,038,577 (Bode et al.), 3,969,718 (Strom), 3,990,068 (Mayer et al.), 4,027,188 (Bergman), 5,984,747 (Bhagavatula et al.), 6,255,777 (Kim et al.), 6,633,117 (Shinoda et al.), 6,650,055 (Ishimoto et al.), and 6,677,704 (Ishimoto et al.), all incorporated herein by reference. Both AC and DC gas discharge tubes are contemplated.

As used herein, the elongated Plasma-tube is intended to include capillary, filament, filamentary, illuminator, hollow rod, or other such terms. It includes an elongated enclosed gas filled structure having a length dimension that is greater than its cross-sectional width dimension. The width of the Plasma-tube is the viewing width from the top or bottom (front or rear) of the display. A Plasma-tube has multiple gas discharge pixels of 100 or more, typically 500 to 1000 or more, whereas a Plasma-shell such as a Plasma-sphere typically has only one gas discharge pixel. In some embodiments, the Plasma-shell may comprise more than one pixel, i.e., 2, 3, or 4 pixels up to about 10 pixels.

The length of each Plasma-tube may vary depending upon the PDP structure. In one embodiment hereof, an elongated tube is selectively divided into a multiplicity of lengths. In another embodiment, there is used a continuous tube that winds or weaves back and forth from one end to the other end of the PDP. The Plasma-tubes may be of any geometric cross-section including circular, elliptical, square, rectangular, triangular, polygonal, trapezoidal, pentagonal or hexagonal. The Plasma-tube may contain secondary electron emission materials, luminescent substances, and reflective materials as discussed herein.

Plasma-tubes Combined with Plasma-shells

The Plasma-tubes may be used alone or arranged in any configuration with Plasma-shells. In one embodiment, there are alternative rows of Plasma-shells and Plasma-tubes. The Plasma-tubes may be used for any desired function or purpose including the priming or conditioning of a Plasma-shell PDP. In one embodiment, the Plasma-tubes are arranged at the perimeter of the display to provide priming or conditioning of PDP Plasma-shells.

RELATED PRIOR ART

Spheres, Beads, Ampoules, Capsules

The construction of a PDP out of gas filled hollow microspheres is known in the prior art. Such microspheres are referred to as spheres, beads, ampoules, capsules, bubbles, shells, and so forth. The following prior art relates to the use of microspheres in a PDP and are incorporated herein by reference.

U.S. Pat. No. 2,644,113 (Etzkorn) discloses ampoules or hollow glass beads containing luminescent gases that emit a colored light. In one embodiment, the ampoules are used to radiate ultraviolet light onto a phosphor external to the ampoule itself.

U.S. Pat. No. 3,848,248 (MacIntyre) discloses the embedding of gas filled beads in a transparent dielectric. The beads are filled with a gas using a capillary. The external shell of the beads may contain phosphor.

U.S. Pat. No. 3,998,618 (Kreick et al.) discloses the manufacture of gas filled beads by the cutting of tubing. The tubing is cut into ampoules (shown as domes in FIG. 2) and heated to form shells. The gas is a rare gas mixture, 95% neon, and 5% argon at a pressure of 300 Torr.

U.S. Pat. No. 4,035,690 (Roeber) discloses a plasma panel display with a plasma forming gas encapsulated in clear glass shells. Roeber used commercially available glass shells containing gases such as air, $SO_2$ or $CO_2$ at pressures of 0.2 to 0.3 atmosphere. Roeber discloses the removal of these residual gases by heating the glass shells at an elevated temperature to drive out the gases through the heated walls of the glass shell. Roeber obtains different colors from the glass shells by filling each shell with a gas mixture, which emits a color upon discharge, and/or by using a glass shell made from colored glass.

U.S. Pat. No. 4,963,792 (Parker) discloses a gas discharge chamber including a transparent dome portion.

U.S. Pat. No. 5,326,298 (Hotomi) discloses a light emitter for giving plasma light emission. The light emitter comprises a resin including fine bubbles in which a gas is trapped. The gas is selected from rare gases, hydrocarbons, and nitrogen.

Japanese Patent 11238469A (Yoshiaki) discloses a plasma display panel containing a gas capsule. The gas capsule is provided with a rupturable part, which ruptures when it absorbs a laser beam.

U.S. Pat. No. 6,545,422 (George et al.) discloses a light-emitting panel with a plurality of sockets with spherical or other shape micro-components in each socket sandwiched between two substrates. The micro-component includes a shell filled with a Plasma-forming gas or other material. The light-emitting panel may be a plasma display, electroluminescent display, or other display device. Other patents by George et al. and various joint inventors include U.S. Pat. Nos. 6,570,335 (George et al.), 6,612,889 (Green et al.), 6,620,012 (Johnson et al.), 6,646,388 (George et al.), 6,762,566 (George et al.), 6,764,367 (Green et al.), 6,791,264 (Green et al.), 6,796,867 (George et al.), 6,801,001 (Drobot et al.), 6,822,626 (George et al.), 6,902,456 (George et al.), 6,935,913 (Wyeth et al.), 6,975,068 (Green et al.), 7,005,793 (George et al.), 7,025,648 (Green et al.), 7,125,305 (Green et al.), 7,137,857 (George et al.), and 7,140,941 (Green et al.), all incorporated herein by reference.

U.S. Patent Application Publications filed by the various joint inventors of George et al. include 2004/0063373 (Johnson et al.), 2005/0095944 (George et al.), and 2006/0097620 (George et al.), all incorporated herein by reference.

Also incorporated herein is U.S. Pat. No. 6,864,631 (Wedding), which discloses a PDP comprised of microspheres filled with ionizable gas.

SUMMARY OF THE INVENTION

In accordance with the practice of this invention, the gas discharge space within a gas discharge plasma display device comprises one or more elongated tubes, each tube containing an ionizable gas mixture capable of forming a positive column gas discharge when a sufficient voltage is applied to opposing electrodes in close proximity to the tube.

As used herein elongated tube is intended to include capillary, filament, filamentary, illuminator, hollow rods, or other such terms. It includes an elongated enclosed gas filled structure having a length dimension, which is greater than its cross-sectional width dimension. The width of the tube is the viewing width from the top or bottom (front or rear) of the display.

In one embodiment, this invention comprises elongated tubes containing ionizable gas in a monochrome or multi-color gas discharge (plasma) display wherein photons from the gas discharge within a tube excite a phosphor such that the phosphor emits light in the visible and/or invisible spectrum. The invention is described hereinafter with reference to a plasma display panel (PDP) in an AC gas discharge (plasma) display.

The practice of this invention provides a tubular AC plasma display device with a robust cell structure that is free from problems associated with dimensional tolerance requirements in the prior art.

The practice of this invention also provides for plasma display devices to be produced with simple alignment methods using non-rigid, flexible substrates such as polymers or plastics.

The practice of this invention provides for low cost manufacturing processes such as continuous roll manufacturing processes by separating the manufacture of the light producing tube elements from the manufacture of the substrate.

The practice of this invention provides for the simultaneous addressing of multiple rows of pixels without physically dividing or separating the display screen as is done with conventional plasma displays.

This invention provides for the improved priming or conditioning of pixels.

The practice of this invention provides for the reduction of false contour that is often observed in a standard plasma display.

The practice of this invention also provides for a positive column plasma gas discharge device having increased brightness and improved luminous efficiency.

BRIEF DESCRIPTION OF THE DRAWINGS

FIGS. 6A, 6B, 6C are tables mapping electrode connections to physical locations.

DETAILED DESCRIPTION OF THE DRAWINGS

Figure 1:
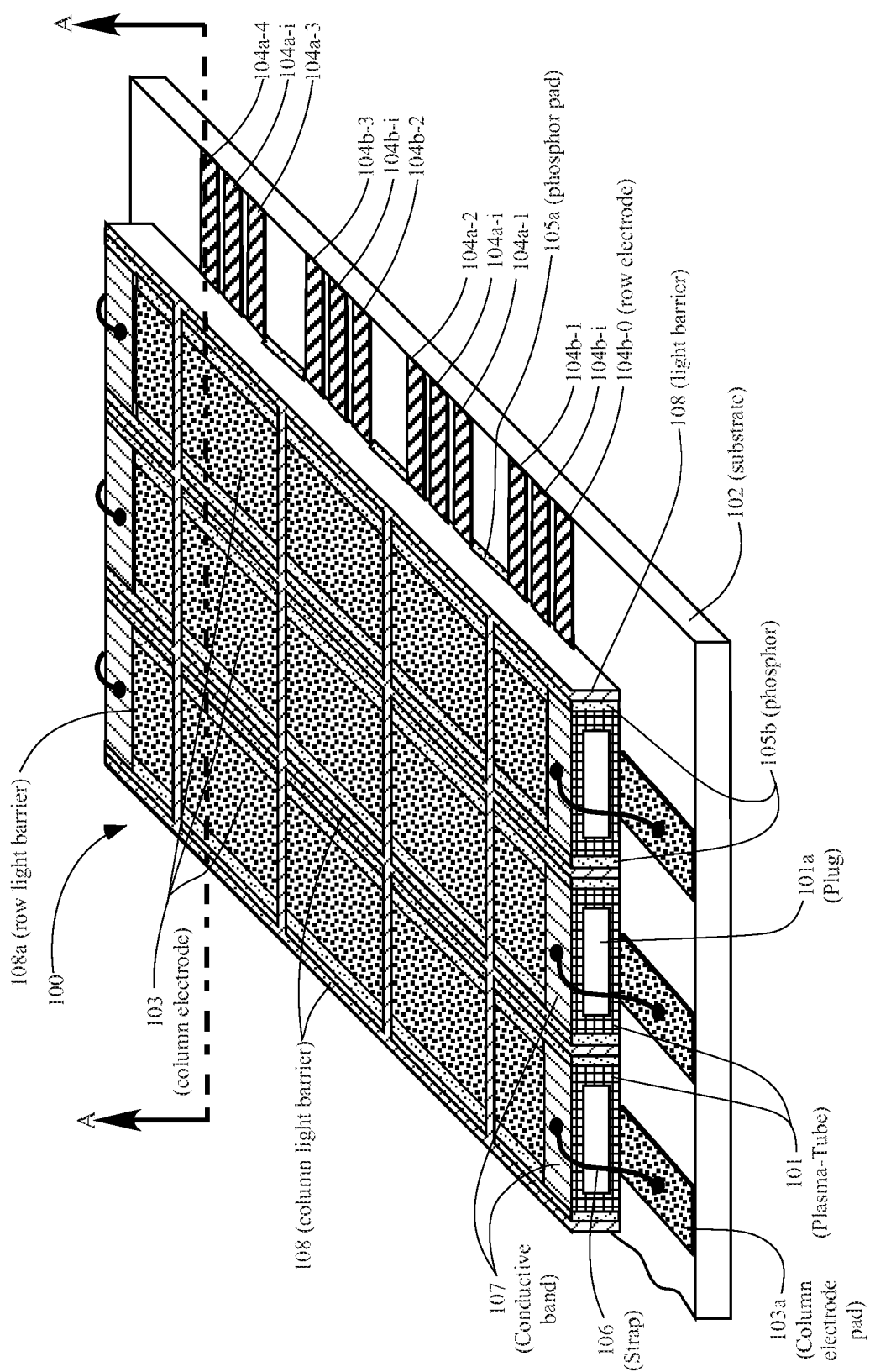
FIG. 1 is a prospective of a monolithic or single substrate positive column discharge AC plasma display with ionizable gas filled elongated tubes.

FIG. 1 is a top view of a positive column discharge AC plasma discharge display (100) comprising multiple gas filled hollow rectangular capillary tubes (101), assembled on a single substrate (102) to form the plasma display panel (100). This embodiment uses rectangular cross-section tubes (101) made from a material with a high UV transmission factor such as optical grade clear fused quartz. Such capillary tubes are commercially available in standard and custom sizes and shapes with internal dimensions of 100 microns or larger and wall thickness of 25 microns or larger. As used herein 25.4 microns equals one mil. One mil equals 0.001 inch. The capillary tubes (101) are evacuated and filled with an appropriate ionizing gas mixture and then sealed using a plug (101*a*) as shown or sealed by any other suitable means including heat fusion. The exterior top surface of tube (101) contains a column electrode (103), which can be of a transparent material such as ITO. Connection to this electrode (103) is made through a physically robust conductive ring or band (107) at the end of each tube (101). The conductive band (107) is connected to electrode pad (103*a*) by conductive strap (106). Other connective methods may also be used including conductive bonding. The two sides of the rectangular tube (101) adjacent to column electrode (103) contain phosphor (105*b*). The distance between these two sides is the rectangular tube width as viewed by the observer from the top or bottom of the display. In a circular tube, this would be the diameter. The phosphor may be added during tube manufacture or after positioning of the tube on the substrate (102). The substrate (102) contains row electrodes (104), electrode pads (103*a*) and phosphor pads (105*a*). The flat surface of the tube (101) is arranged to make intimate contact with the flat surface of the row electrodes (104) and the phosphor pad (105*a*).

The row electrodes (104) comprise (104*b*-0) and (104*b*-1) with a passive or inactive isolation bar (104*b*-*i*), (104*a*-1) and (104*a*-2) with isolation bar (104*a*-*i*), (104*b*-2) and (104*b*-3) with isolation bar (104*b*-*i*), and (104*a*-3) and (104*a*-4) with isolation bar (104*a*-*i*). The positive column discharge takes place along the length of the tube between adjacent row electrodes such as (104 *b*-1) and (104*a*-1), (104*a*-2) and (104*b*-2), (104*b*-3) and (104*a*-3). The isolation bars help contain the positive column discharge and prevent spreading of the discharge down the tube.

The discharge provides photons which excite phosphor (105*a*) and (105*b*) with the excited phosphor emitting visible light which can be viewed from the top through the transparent column electrodes (103) between column light barriers (108) and row light barriers (108*a*). The top column electrodes (103) may have a split, window, or ladder structure. Likewise, conductive bus bars (not shown) may be located along one or both edges of the transparent electrodes (103).

In one panel fabrication embodiment, tubes (101) of the desired length are bonded to a continuous web substrate (102), the substrate having a plurality of row electrodes (104) oriented perpendicular to the column electrodes (103). Pixels are defined by the intersections of electrodes (103) and (104), the relative relationship of which is not constrained to a precise position of the electrode (103) in its length-wise direction. The matching flat geometry of the rectangular tubes (101) and the substrate row electrodes (104) provides precise electrode (104) definition and orientation relative to each tube (101) without forming the electrodes (104) on the tubes (101). This arrangement accommodates high tolerance capillary tube alignment during manufacture and avoids critical registration of tube electrodes and substrate electrodes as required in the prior art.

Figure 1A:
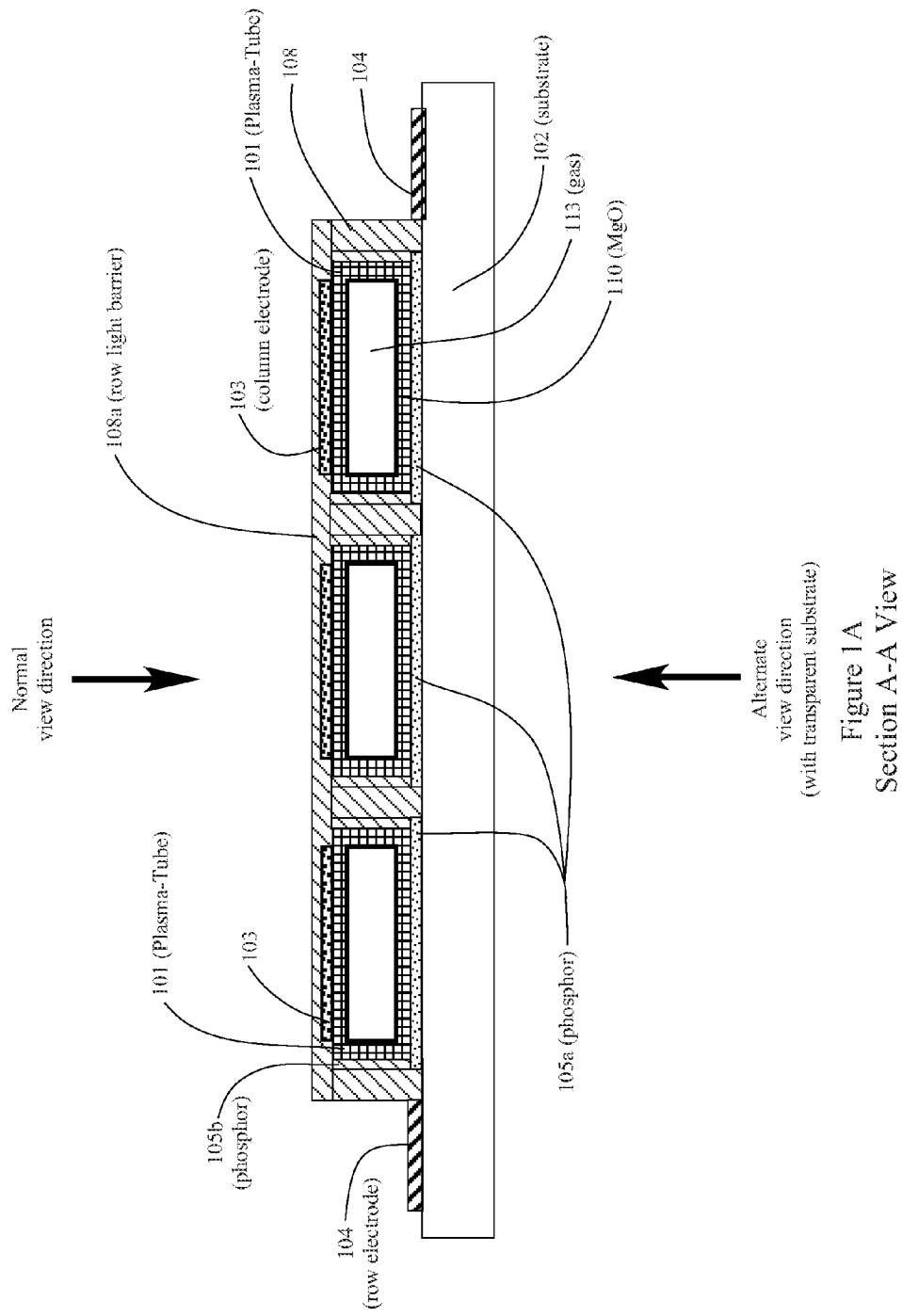
FIG. 1A is a section of the single substrate and elongated tubes in FIG. 1.

FIG. 1A shows a Section A-A view of the tubes (101) assembled on substrate (102). To facilitate the discharge process, all or a portion of the inside of each capillary tube is coated with a thin layer of MgO (110) prior to gas processing and sealing. A gas (113) is shown. The optical grade clear fused quartz tube is highly transparent to UV light allowing the phosphor (105*a*) and (105*b*) to be placed on the outside of the tube while being excited by the UV transmission through each tube. The combined effect of (105*a*) and (105*b*) is a phosphor channel on the outside of the tube inside of which the UV light is generated. Further a very thin layer of phosphor (not shown) may also be applied over the top column electrode (103) to enhance the appearance of the visible light generated by a subpixel. Placing phosphor outside the plasma discharge capillary serves to protect the phosphor from the gas discharge and direct ion and electron impingement thereby helping to prolong the life of the phosphor and the plasma display. Added light barriers (108) may be provided between each tube (101) to prevent light optical cross talk between pixels. In one preferred embodiment, ink jet deposition may be used to adhere phosphor either to the substrate or the tubes, before or after tube/substrate assembly. Ink jet deposition facilitates the continuous panel fabrication process by precise programmable application of phosphor to the tubes and substrate. For example, both the phosphor (105*b*) and the opaque light barrier (108) can be built-up in place by applying successive layers of material by ink jet. This process is sometimes referred to as 3-D printing or stereolithography. The process provides a programmable flexibility in panel fabrication to accommodate different configurations and sizes of panels on one automated continuous substrate web production machine. Also, shown in FIG. 1A is the normal panel viewing direction from the top. However, the glass substrate (102) can also be used to permit viewing from the opposite side. When a glass substrate is used and viewed from the substrate side, the glass substrate forms a natural barrier to protect the more fragile capillary tubes from inadvertent physical damage when in use.

In accordance with one embodiment and best mode of this invention, the AC plasma display with elongated tubes as illustrated in FIGS. 1 and 1A is operated in the positive column region of the gas discharge. U.S. Pat. No. 6,184,848 (Weber) discloses the advantages of operation in the positive column region and is incorporated herein by reference.

Figure 2:
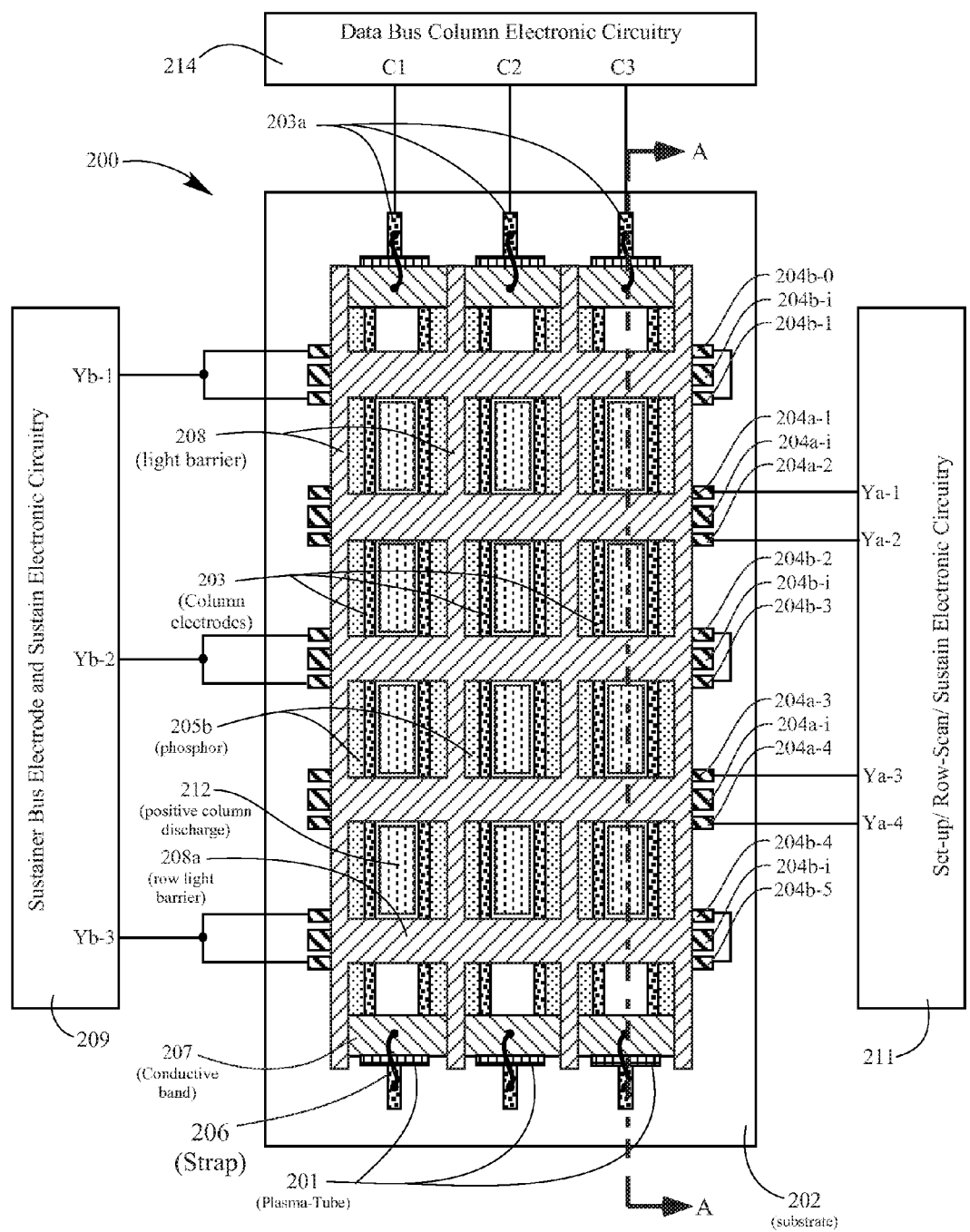
FIG. 2 is a top view of a single substrate positive column discharge AC plasma display with ionizable gas filled elongated tubes and drive electronics with an inactive isolation bar.

FIG. 2 shows a monolithic or single substrate positive column discharge AC plasma panel (200) with drive electronics (209), (214) and (211) arranged for positive column discharge UV and/or IR photon illumination of phosphor (205*a*) and (205*b*). This embodiment of capillary tube display panels overcomes isolation and barrier problems associated with prior art dual substrate glass sandwich display panels with positive column UV emission as disclosed in Weber ('848). Glass sandwich dual substrate displays require a precision network of barrier ribs between the glass panel sheets to laterally confine the long positive column discharge path. Barrier defects can adversely affect display panel manufacturing yield, display operation, and display appearance.

The tube configuration and structure of the present invention provides ideal lateral confinement of the long discharge without the disadvantages of the prior art. Positive column discharge can have a UV conversion efficiency of 80% as opposed to 30% percent for the prior art. Consequently, a positive column discharge can produce an 80% total efficiency as compared to only 15% efficiency for traditional negative glow discharge. The combination of high UV output positive column discharge, high UV emitting ionizable gas, and UV transmissive glass provides for a very high intensity UV illumination of each pixel and phosphor. High UV and/or IR illumination of the phosphor translates to a bright visible light and a bright display panel. Capillary tubes (201) with column data electrodes (203) are arranged perpendicular to the row electrodes (204*a*), (204*b*) on single substrate (202).

The intersections of electrodes (203) and (204) define display pixels. The substantial separation of electrodes (204a) and (204b) along the direction of electrodes (203) defines the positive column discharge area along the length and inside of the tube (201). Each electrode (203) is connected via conductive band (207) and conductive strap (206) to column electrode pad (203a), which is connected to data bus column electrode circuitry (214). Each pair of row electrodes (204a) or (204b) forms a loop inside of which there is an electrically conductive isolation bar (204a-i) or (204b-i). Each pair of electrodes (204b) is separated by isolation bar (204b-i) and is connected to the sustain bus electronic circuitry (209). Each pair of electrodes (204a) is separated by isolation bar (204a-i) and is connected to a set-up scan sustain electronic circuitry (211). As described in Weber ('848), a plurality of loops (204b) each of which comprise a pair of parallel electrodes is interleaved between pairs of single scan electrodes (204a). The isolation bars are optional and may be used to insure that there is no significant discharge activity in the inter pixel gap. Typically the isolation bars are conductive. When appropriate sustain signals are applied, pixel illumination selectively occurs between adjoining scan and sustain electrodes by virtue of positive column discharges. The discharges at an ON pixel "ping pong" between one discharge cell which exists at the intersection of a sustain electrode and an address electrode, and a second discharge cell which exists at a scan electrode and the address electrode. In this embodiment, the pixel pitch is on the order of 1320 microns with sustain electrode width of 100 microns and a sustain gap on the order of 700 microns. The present invention is ideal for the long discharge path required for positive column discharge. The tube configuration provides lateral confinement of the long discharge to eliminate pixel cross talk. At the same time the present invention provides optimal sustain to address electrode spacing of about 110 microns to eliminate the need for excessive high drive voltage and excessively low gas pressure.

Figure 2A:
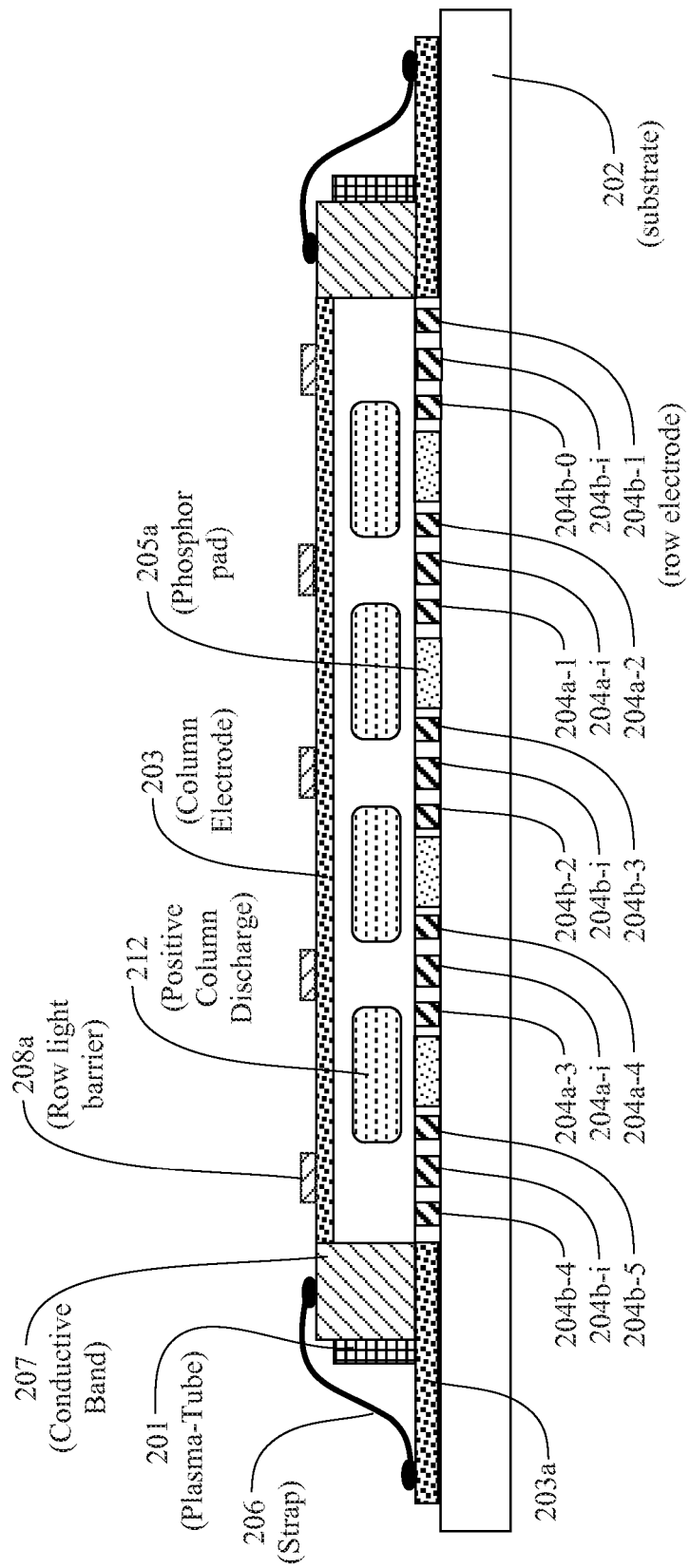
FIG. 2A is a section of the single substrate and elongated tubes in FIG. 2.

FIG. 2A is a Section A-A view illustrating the long 700 micron positive column discharge (212) between sustain electrodes (204a) and (204b). The cavity formed on the substrate (202) by the height of the electrodes (204) and the space between them is filled with phosphor pad (205a). Weber ('848) discloses this space as being 28 mils wide. This phosphor pad (205a) spans the underside pixel tube discharge area. The vertical tube sidewalls may also be coated with phosphor (205b). This arrangement efficiently captures the UV emissions of the positive column discharge (212) from three sides of a channel. High UV light output and phosphor placement provide high display visible light output. Light barriers (208) and (208a) may be located between pixels to minimize light cross talk.

Figure 3:
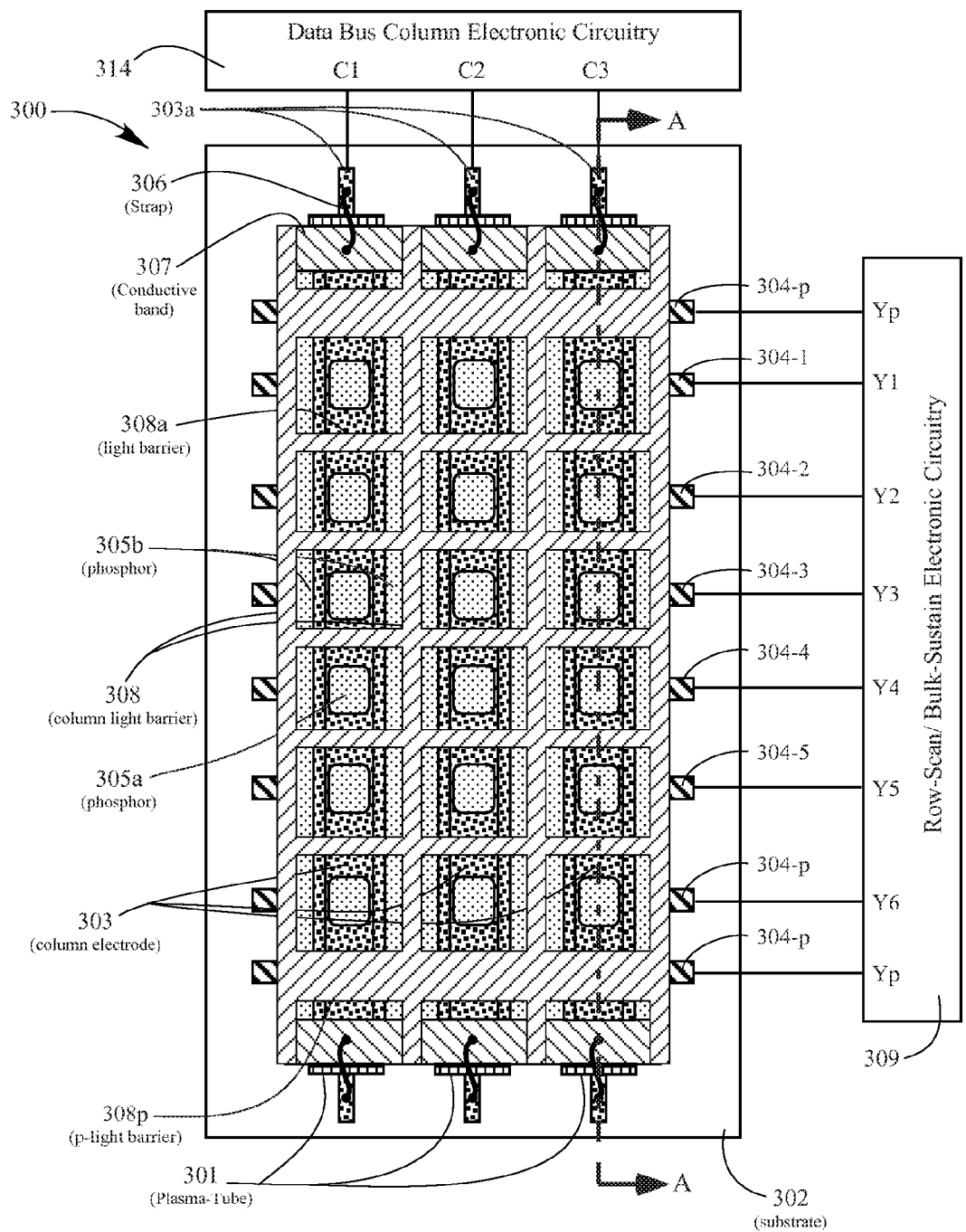
FIG. 3 is a top view of a single substrate columnar discharge AC plasma display with ionizable gas filled elongated tubes and drive electronics.

FIG. 3 shows a single substrate columnar discharge AC plasma display (300) with electronics (309) and (314) arranged for columnar plasma discharge. Each column electrode (303) is connected via conductive band (307) and conductive strap (306) to electrode pad (303a), which is connected to data bus electronic circuitry (314). Electrodes (304) are connected to electronic circuitry (309).

Figure 3A:
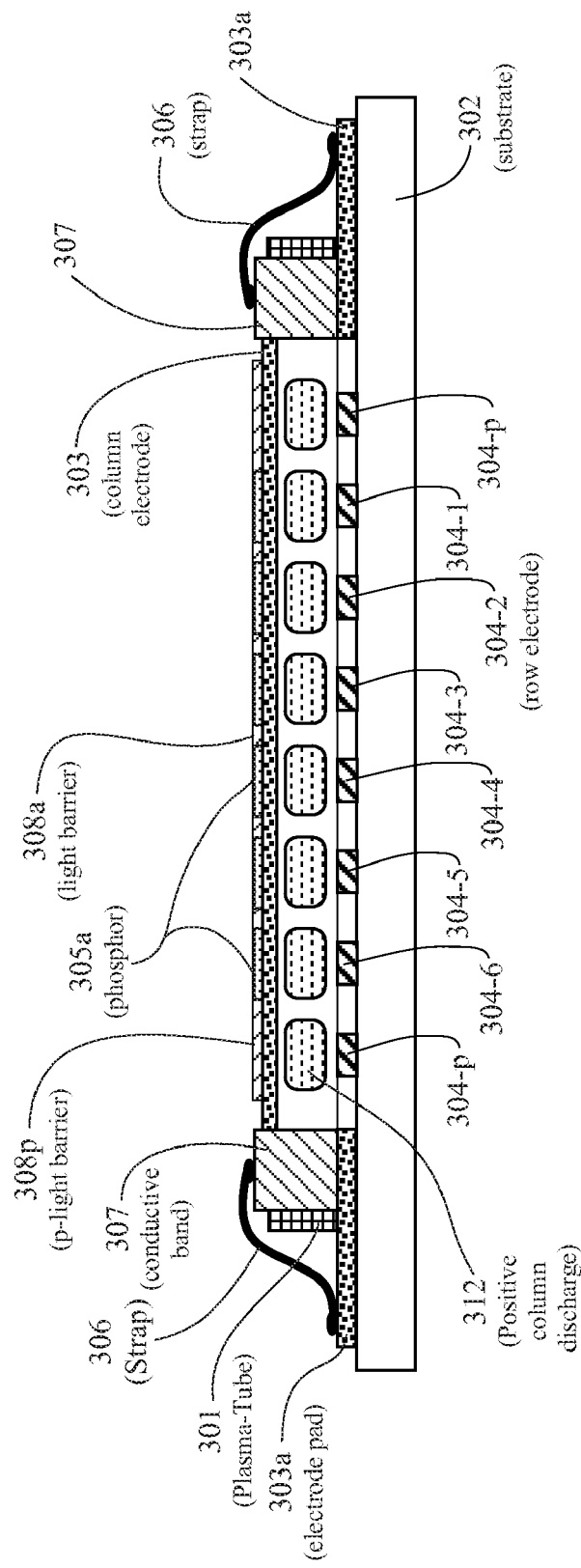
FIG. 3A is a section of the single substrate and elongated tubes in FIG. 3.

FIG. 3A is a Section A-A view showing plasma discharge (312) directly between electrodes (303) and (304). This discharge provides UV photons to the surrounding phosphor (305a) and (305b). Also shown are single substrate (302), tube (301), pilot or conditioning electrodes (304-p), pilot light barriers (308p), and light barriers (308), (308a).

Figure 4:
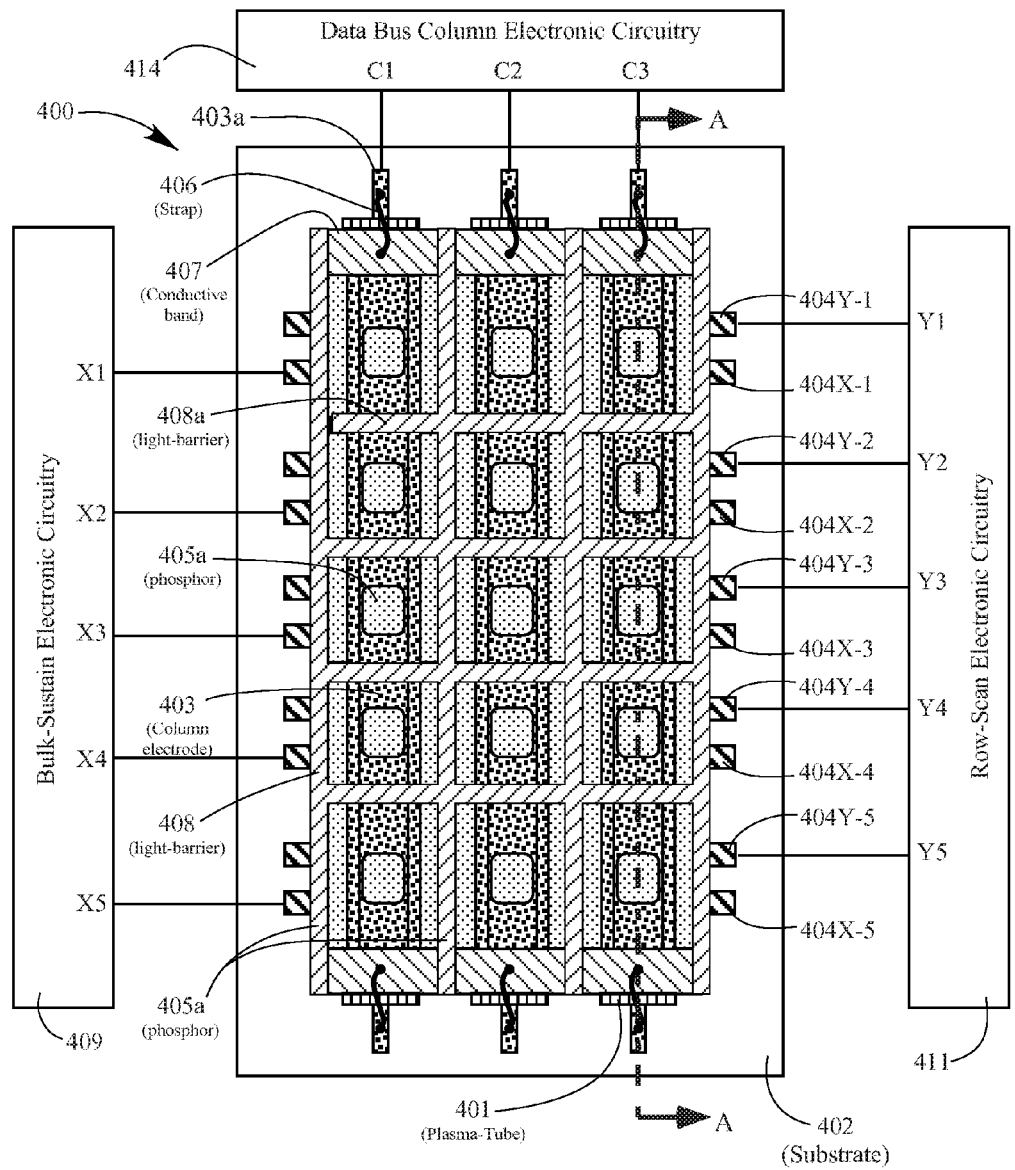
FIG. 4 is a top view of a single substrate surface discharge AC plasma display with ionizable gas filled elongated tubes and drive electronics.

FIG. 4 shows a single substrate surface discharge AC plasma display panel (400) with electronics (409), (414) and (411) arranged for surface discharge. Each column data electrode (403) is connected via conductive band (407) and conductive strap (406) to electrode pad (403a), which is connected to electronic circuitry (414). The electrodes (404X) and (404Y) are connected to row scan electronics (411) and sustain electronics (409) such that once a cell discharge is initiated by the data bus electrode (403), the discharge will be sustained between the (404X) and (404Y) electrodes.

Figure 4A:
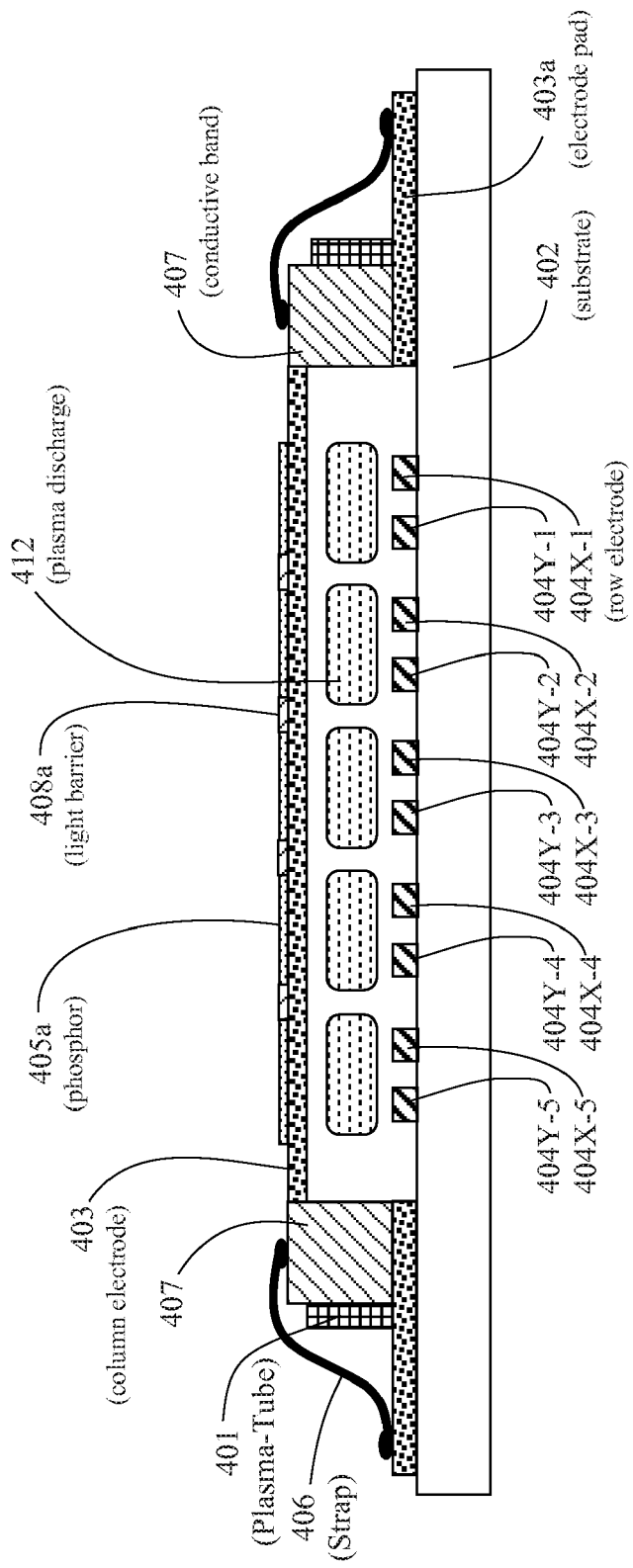
FIG. 4A is a section of the single substrate and elongated tubes in FIG. 4.

FIG. 4A is a Section A-A view showing the plasma discharge (412) directly between electrodes (403) and (404) which provides photon illumination of the surrounding phosphor (405a) and (405b). Also shown are substrate (402), tube (401), and light barriers (408), (408a).

Figure 5:
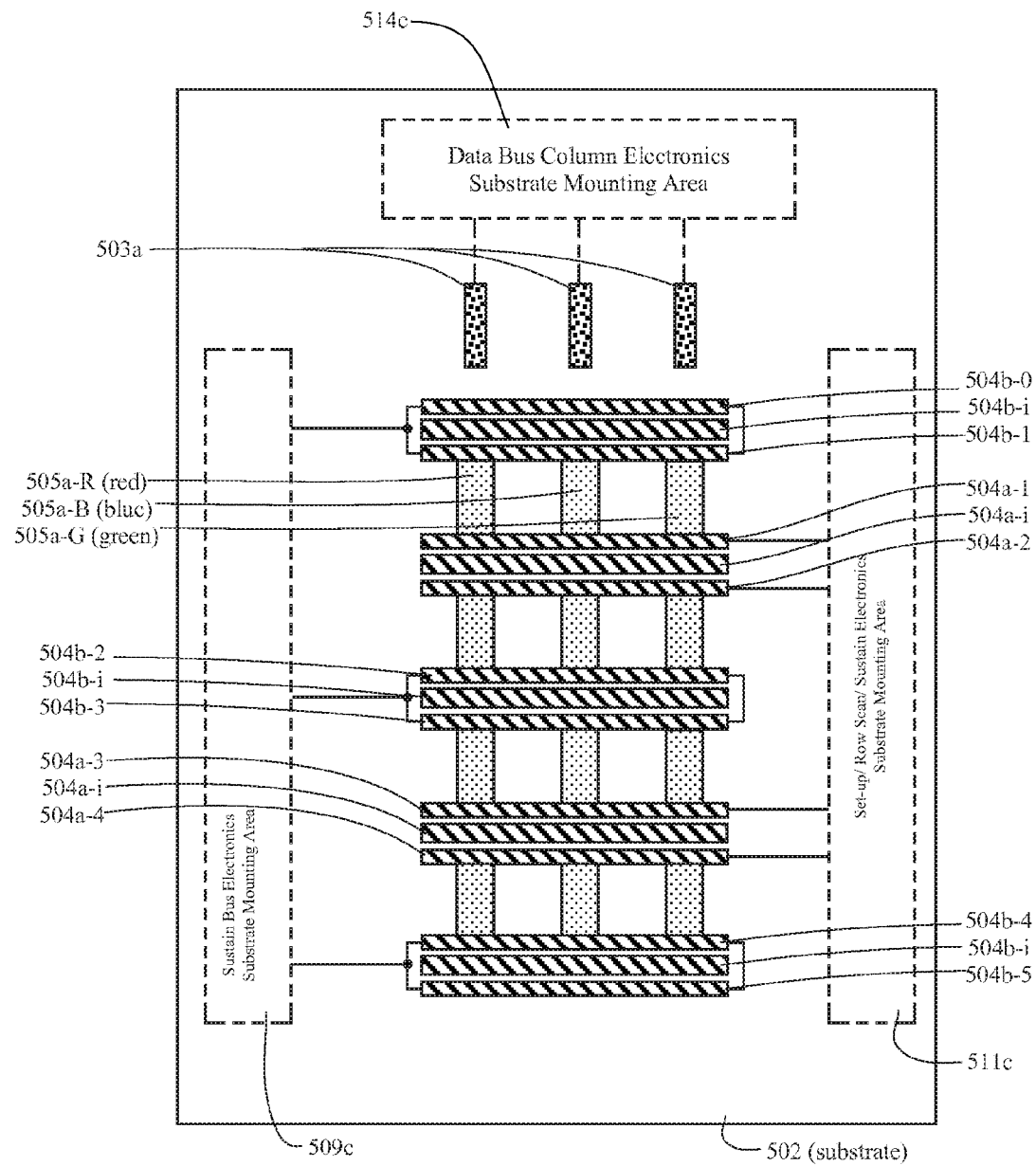
FIG. 5 is a top view of a single substrate positive column discharge AC plasma display substrate illustrating RGB phosphor locations before the tubes are positioned on the substrate.

FIG. 5 shows a single substrate (502) without tubes attached. The substrate (502) has set-up sustain electrodes (504a) and loop sustain electrodes (504b) as well as electrode pads (503a) to facilitate connection to the capillary tube electrodes and drive electronics. Triads of red, blue and green phosphor (505-R), (505-B), (505-G) may be applied by programmable inkjet printing. Inkjet printing may be used for the precision deposition of adhesives, dielectrics and other materials for automated continuous web manufacture of large display panels.

A standard plasma display is addressed one row at a time. The addressing of each row takes a finite amount of time. In order to maintain a flicker free image, the display must be updated at video rates. Therefore, there is a practical limit as to how many rows a plasma display may have. In order to achieve more rows with a plasma display, often the column electrodes are split at the center of the display and the two halves are addressed from the top and from the bottom as two independent displays. This is referred to in the PDP industry as dual scan.

This can be achieved with a tube display by simply adding another electrode layer for additional column electrodes. FIG. 6A is a table that maps physical address of the display against the internal electrode configuration in the case where the number of data electrodes has been doubled. One set of data electrodes are represented as I1 through I9, and a second set of electrodes parallel to I1 through I9, but on a different plane are represented as m1 through m9. Each set of these data electrodes connects to a unique subset of tubes defined by a unique set of rows. For example the Table in FIG. 6A shows I1 through I9 connecting only to rows R1 through R4 and m1 through m9 connecting only to rows n5 though n8. This allows two rows to be addressed simultaneously. In one row scan time, two rows are addressed simultaneously. Although the concept is illustrated with two rows being simultaneously addressed, the concept is expandable to more than two rows. By addressing two or more rows at a time, the display may be refreshed faster.

In a standard plasma display gray shades are achieved by time multiplexing. The brightness of a pixel is proportional to how many sustains pulses it experiences while in the ON state. One frame is composed of subfields with varying numbers of sustains. The subfields may be summed in various combinations to achieve the full compliment of unique gray levels (usually 256).

Two problems that occur with this technique are false contour and motion artifact. In general both of these artifacts occur because the human eye does not integrate the subfields properly. There are several ways to alleviate this problem including increasing the update speed as described above. Another way is to separate the pixels that are changing to allow the eye to integrate over an area. By physically separating the pixels that are being addressed, changes will be less obvious to the observer. This may be done with a tube display by taking advantage of the ability to have electrodes on multiple layers.

FIG. 6B and FIG. 6C shows tables that map the physical address of the display with the electrode address. In FIG. 6B the address electrodes attach in a zigzag pattern. For example address electrode n4 alternates between Row 4 and Row 2. When n4 is selected to be scanned, the spheres at (R4, C1), (R2, C2), and (R4, C4) are addressed. The pixels are physically separated in a crosshatch pattern. FIG. 6C shows an alternative pattern in which the pixels are physically shifted in a diagonal pattern.

In one embodiment of this invention as illustrated in FIGS. 6A, 6B, 6C, one portion or section of the display is addressed while another portion or section is sustained. This is referred to as Simultaneous Address and Sustain (SAS).

In accordance with the electrode connections of FIGS. 6A, 6B, and 6C, multiple layers of cells or pixels may be used to randomize the presentation of cells that are written simultaneously.

Present PDPs allow only a single layer of metallization so each writing event addresses a line of adjacent contiguous cells somewhere on the PDP. Multi layers allow the crossstrap of the individual panel cells or pixels so that cells written in the writing event may not be in a single line but may be written on different lines at the same time. Consequently one may write different PDP sections at the same time and also write in such a way that no two adjacent cells are addressed at the same time anywhere on the panel.

This randomizes any concentration of light flashes on the display and mitigates sources of complaint as to artifacts.

Figure 7:
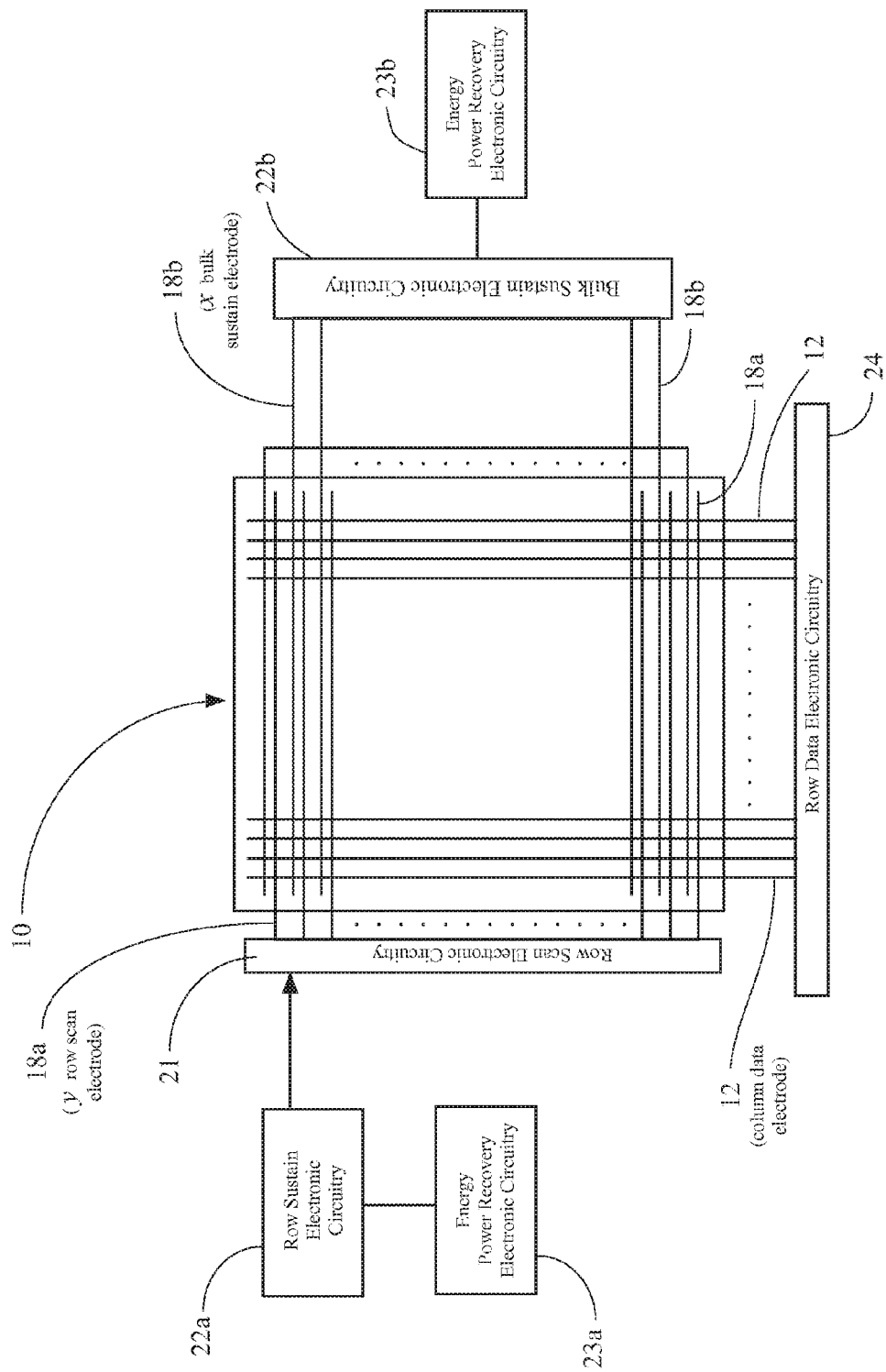
FIG. 7 shows a block diagram of electronics with energy power recovery for driving a surface discharge AC gas discharge plasma display with tubes.

FIG. 7 is a block diagram of a surface discharge AC display panel (10) with electronic circuitry (21) for y row scan electrodes (18*a*), bulk sustain electronic circuitry (22*b*) for x bulk sustain electrode (18*b*) and column data electronic circuitry (24) for the column data electrodes (12). The panel (10) contains an array of elongated Plasma-tubes (not shown) as disclosed herein. This may be a monolithic or single substrate surface discharge PDP or a dual substrate (coplanar) surface discharge PDP.

There is also shown row sustain electronic circuitry (22*a*) with an energy power recovery electronic circuit (23*a*). There is also shown energy power recovery electronic circuitry (23*b*) for the bulk sustain electronic circuitry (22*b*).

Figure 8:
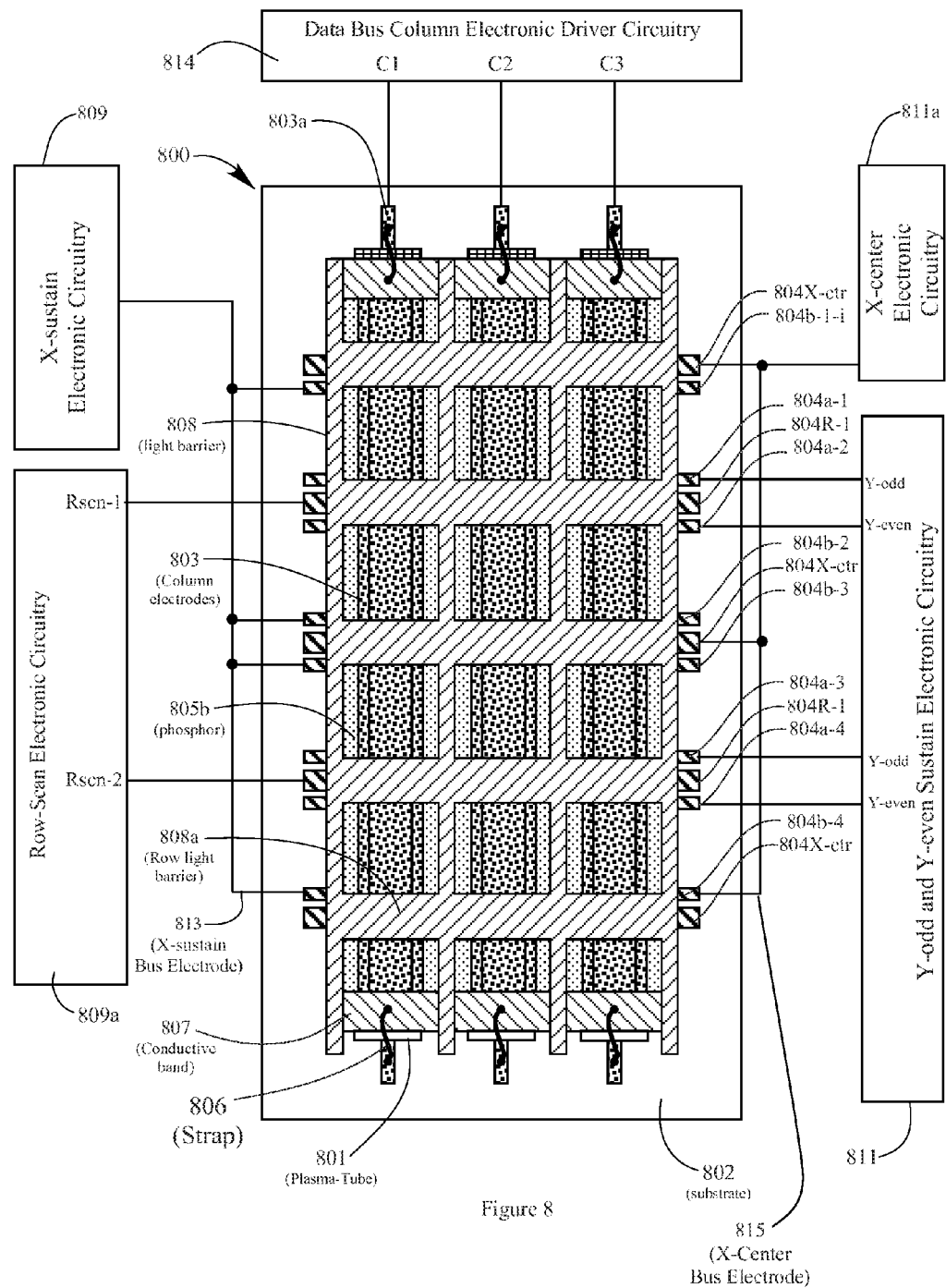
FIG. 8 is a top view of a single substrate positive column discharge AC plasma display with ionizable gas filled elongated tubes and drive electronics using the isolation bar as an active electrode.

FIG. 8 shows an elongated capillary tube panel (800) arranged for positive column gas discharge UV illumination of phosphor including enhanced performance and reduced cost support electronic circuitry (809), (809*a*), (811), (811*a*), and (814).

As described below in the Rutherford IDW 2002 paper, Y-odd and Y-even sustain row electrodes (804*a*-1) and (804*a*-2), etc. are connected to Y-odd and Y-even sustain electronic driver circuits (811) with wide row scan electrodes (804R-1), etc. arranged in the space between them and connected to row-scan electronic driver circuits (809*a*).

X-sustain row electrode pairs (804*b*-2) and (804*b*-3), etc. are connected to X-sustain bus electronic circuits (809), with wide X-center electrodes (804X-ctr) arranged in the space between them and connected to X-center electronic driver circuit (811*a*).

A plurality of Y-odd and Y-even sustain row electrodes pairs (804*a*-1) and (804*a*-2), etc. are interleaved between a plurality of X-sustain row electrode pairs (804*b*-2) and (804*b*-3), etc. Column electrodes (803) are connected via conductive bands (807) and conductive straps (806) to electrode pads (803*a*), which are connected to data bus electronic circuitry (814).

Impervious light barriers (808) may be provided between each tube to minimize or prevent light or optical cross talk between column pixels, subpixels, cells, or sub-cells. Light barriers 808*a* may be provided over tubes (801) and electrodes (803) to block light between row pixels, subpixels cells, or sub-cells.

The two sides of each elongated rectangular tube (801) adjacent to electrode (803) are coated with phosphor (805*b*). Also shown are substrate (802) and tube (801).

PDP Electronics

The electronics architecture used in FIG. 7 may be ADS as described in the Shinoda and other patents cited herein including U.S. Pat. No. 5,661,500 (Shinoda et al.). In addition, other architectures as described herein and known in the prior art may be utilized. These architectures including Shinoda ADS may be used to address Plasma-tubes and Plasmashells in a PDP.

ADS

A basic electronics architecture for addressing and sustaining a surface discharge AC plasma display is called Address Display Separately (ADS). The ADS architecture may be used for a monochrome or multicolor display. The ADS architecture is disclosed in a number of Fujitsu patents including U.S. Pat. Nos. 5,541,618 (Shinoda et al.) and 5,724,054 (Shinoda), incorporated herein by reference. Also see U.S. Pat. Nos. 5,446,344 (Kanazawa) and 5,661,500 (Shinoda et al.), incorporated herein by reference. ADS has become a basic electronic architecture widely used in the AC plasma display industry for the manufacture of PDP monitors and television.

Fujitsu ADS architecture is commercially used by Fujitsu and is also widely used by competing manufacturers including Matsushita and others. ADS is disclosed in U.S. Pat. No. 5,745,086 (Weber), incorporated herein by reference. See FIGS. 2, 3, 11 of Weber ('086). The ADS method of addressing and sustaining a surface discharge display as disclosed in U.S. Pat. Nos. 5,541,618 (Shinoda) and 5,724,054 (Shinoda) incorporated herein by reference, sustains the entire panel (all rows) after the addressing of the entire panel. The addressing and sustaining are done separately and are not done simultaneously. ADS may be used to address Plasma-tubes in a PDP.

ALIS

This invention may also use the shared electrode or electronic ALIS drive system for an AC PDP as disclosed by Fujitsu in U.S. Pat. Nos. 6,489,939 (Asso et al.), 6,498,593 (Fujimoto et al.), 6,531,819 (Nakahara et al.), 6,559,814 (Kanazawa et al.), 6,577,062 (Itokawa et al.), 6,603,446 (Kanazawa et al.), 6,630,790 (Kanazawa et al.), 6,636,188 (Kanazawa et al.), 6,667,579 (Kanazawa et al.), 6,667,728 (Kanazawa et al.), 6,703,792 (Kawada et al.), and U.S. Patent Application Publication 2004/0046509 (Sakita), all of which are incorporated herein by reference. In accordance with this invention, ALIS may be used to address Plasma-tubes in a PDP.

AWD

Another electronic architecture is called Address While Display (AWD). The AWD electronics architecture was first used during the 1970s and 1980s for addressing and sustaining monochrome PDP. In AWD architecture, the addressing (write and/or erase pulses) are interspersed with the sustain waveform and may include the incorporation of address pulses onto the sustain waveform. Such address pulses may be on top of the sustain and/or on a sustain notch or pedestal. See for example U.S. Pat. Nos. 3,801,861 (Petty et al.) and 3,803,449 (Schmersal), both incorporated herein by reference. FIGS. 1 and 3 of the Shinoda ('054) ADS patent disclose AWD architecture as prior art.

The AWD electronics architecture for addressing and sustaining monochrome AC PDP has also been adopted for addressing and sustaining multicolor AC PDP. For example, Samsung Display Devices Co., Ltd., has disclosed AWD and the superimpose of address pulses with the sustain pulse. Samsung specifically labels this as Address While Display (AWD). See Ryeom, J. et al. "High-Luminance and High-Contrast HDTV PDP with Overlapping Driving Scheme." *Proceedings of the Sixth International Display Workshops, IDW 99,* Sendai, Japan (Dec. 1-3, 1999): 743-746, and AWD as disclosed in U.S. Pat. No. 6,208,081 (Eo et al.), incorporated herein by reference.

LG Electronics Inc. has disclosed a variation of AWD with a Multiple Addressing in a Single Sustain (MASS) in U.S. Pat. No. 6,198,476 (Hong et al.), incorporated herein by reference. Also see U.S. Pat. No. 5,914,563 (Lee et al.), incorporated herein by reference. AWD may be used to address Plasma-tubes.

An AC voltage refresh technique or architecture is disclosed by U.S. Pat. No. 3,958,151 (Yano et al.), incorporated herein by reference. In one embodiment of this invention the Plasma-tubes are filled with pure neon and operated with the architecture of Yano ('151).

Energy Recovery

Energy recovery is used for the efficient operation of a PDP. Examples of energy recovery architecture and circuits are well known in the prior art. These include U.S. Pat. Nos. 4,772,884 (Weber et al.), 4,866,349 (Weber et al.), 5,081,400 (Weber et al.), 5,438,290 (Tanaka), 5,642,018 (Marcotte), 5,670,974 (Ohba et al.), 5,808,420 (Rilly et al.) and 5,828,353 (Kishi et al.), all incorporated herein by reference.

Slow Ramp Reset

Slow rise slopes or ramps may be used in the practice of this invention. The prior art discloses slow rise slopes or ramps for the addressing of AC plasma displays. The early patents include U.S. Pat. Nos. 4,063,131 (Miller), 4,087,805 (Miller), 4,087,807 (Miavecz), 4,611,203 (Criscimagna et al.), and 4,683,470 (Criscimagna et al.), all incorporated herein by reference.

An architecture for a slow ramp reset voltage is disclosed in U.S. Pat. No. 5,745,086 (Weber), incorporated herein by reference. Weber ('086) discloses positive or negative ramp voltages that exhibit a slope that is set to assure that current flow through each display pixel site remains in a positive resistance region of the gas discharge. The slow ramp architecture may be used in combination with ADS as disclosed in FIG. 11 of Weber ('086). PCT Patent Application WO 00/30065 (Hibino et al.) and U.S. Pat. No. 6,738,033 (Hibino et al.) also disclose architecture for a slow ramp reset voltage and are incorporated herein by reference.

Artifact Reduction

Artifact reduction techniques may be used in the practice of this invention. The PDP industry has used various techniques to reduce motion and visual artifacts in a PDP display. Pioneer of Tokyo, Japan has disclosed a technique called CLEAR for the reduction of false contour and related problems. See Tokunaga et al. "Development of New Driving Method for AC-PDPs". *Proceedings of the Sixth International Display Workshops, IDW 99,* Sendai, Japan (Dec. 1-3, 1999): 787-790. Also see European Patent Applications EP 1 020 838 A1 (Tokunaga et al). The CLEAR techniques disclosed in the above Pioneer IDW publication and Pioneer EP 1020838 A1, are incorporated herein by reference.

In the practice of this invention, it is contemplated that the ADS architecture may be combined with a CLEAR or like technique as required for the reduction of motion and visual artifacts. The CLEAR and ADS may also be used with the slope ramp address.

SAS

In one embodiment of this invention it is contemplated using SAS electronic architecture to address a PDP panel constructed of Plasma-tubes. SAS architecture comprises addressing one display section of a surface discharge PDP while another section of the PDP is being simultaneously sustained. This architecture is called Simultaneous Address and Sustain (SAS). See U.S. Pat. No. 6,985,125 (Wedding et al.), incorporated herein by reference.

SAS offers a unique electronic architecture, which is different from prior art columnar discharge, and surface discharge electronics architectures including ADS, AWD, and MASS. It offers important advantages as discussed herein.

In accordance with the practice of SAS with a surface discharge PDP, addressing voltage waveforms are applied to a surface discharge PDP having an array of data electrodes on a bottom or rear substrate and an array of at least two electrodes on a top or front viewing substrate, one top electrode being a bulk sustain electrode x and the other top electrode being a row scan electrode y. The row scan electrode y may also be called a row sustain electrode because it performs the dual functions of both addressing and sustaining.

An important feature and advantage of SAS is that it allows selectively addressing of one section of a surface discharge PDP with selective write and/or selective erase voltages while another section of the panel is being simultaneously sustained. A section is defined as a predetermined number of bulk sustain electrodes x and row scan electrodes y. In a surface discharge PDP, a single row is comprised of one pair of parallel top electrodes x and y.

In one embodiment of SAS, there is provided the simultaneous addressing and sustaining of at least two sections $S_1$ and $S_2$ of a surface discharge PDP having a row scan, bulk sustain, and data electrodes, which comprises addressing one section $S_1$ of the PDP while a sustaining voltage is being simultaneously applied to at least one other section $S_2$ of the PDP.

In another embodiment, the simultaneous addressing and sustaining is interlaced whereby one pair of electrodes y and x is addressed without being sustained and an adjacent pair of electrodes y and x is simultaneously sustained without being addressed. This interlacing can be repeated throughout the display. In this embodiment, a section S is defined as one or more pairs of interlaced y and x electrodes.

In the practice of SAS, the row scan and bulk sustain electrodes of one section that is being sustained may have a reference voltage which is offset from the voltages applied to the data electrodes for the addressing of another section such that the addressing does not electrically interact with the row scan and bulk sustain electrodes of the section which is being sustained.

In a plasma display in which gray scale is realized through time multiplexing, a frame or a field of picture data is divided into subfields. Each subfield is typically composed of a reset period, an addressing period, and a number of sustains. The number of sustains in a subfield corresponds to a specific gray scale weight. Pixels that are selected to be "on" in a given subfield will be illuminated proportionally to the number of sustains in the subfield. In the course of one frame, pixels may be selected to be "on" or "off" for the various subfields. A gray scale image is realized by integrating in time the various "on" and "off" pixels of each of the subfields.

Addressing is the selective application of data to individual pixels. It includes the writing or erasing of individual pixels.

Reset is a voltage pulse which forms wall charges to enhance the addressing of a pixel. It can be of various waveform shapes and voltage amplitudes including fast or slow rise time voltage ramps and exponential voltage pulses. A reset is typically used at the start of a frame before the addressing of a section. A reset may also be used before the addressing period of a subsequent subfield.

In accordance with another embodiment of the SAS architecture, there is applied a slow rise time or slow ramp reset voltage as disclosed in U.S. Pat. No. 5,745,086 (Weber) cited above and incorporated herein by reference. As used herein slow rise time or slow ramp voltage is a bulk address commonly called a reset pulse with a positive or negative slope so as to provide a uniform wall charge at all pixels in the PDP. The slower the rise time of the reset ramp, the less visible the light or background glow from those off-pixels (not in the on-state) during the slow ramp bulk address.

Less background glow is particularly desirable for increasing the contrast ratio, which is inversely proportional to the light-output from the off-pixels during the reset pulse. Those off-pixels which are not in the on-state will give a background glow during the reset. The slower the ramp, the less light output with a resulting higher contrast ratio. Typically the slow ramp reset voltages disclosed in the prior art have a slope of about 3.5 volts per microsecond with a range of about 2 to about 9 volts per microsecond. In the SAS architecture, it is possible to use slow ramp reset voltages below 2 volts per microsecond, for example about 1 to 1.5 volts per microsecond without decreasing the number of PDP rows, without decreasing the number of sustain pulses or without decreasing the number of subfields.

Positive Column Gas Discharge

In one embodiment of this invention, it is contemplated that the PDP with Plasma-tubes may be operated with positive column gas discharge. The use of Plasma-tubes allows the PDP to be operated with positive column gas discharge, for example as disclosed by Weber, Rutherford, and other prior art cited hereinafter and incorporated herein by reference. The discharge length inside the Plasma-tube must be sufficient to accommodate the length of the positive column gas discharge. U.S. Pat. No. 6,184,848 (Weber) discloses the generation of a positive column plasma discharge wherein the plasma discharge evidences a balance of positively charged ions and electrons.

Rutherford, James, "PDP With Improved Drive Performance at Reduced Cost". *Proceedings of the Ninth International Display Workshops*, Hiroshima, Japan (Dec. 4-6, 2002): 837-840 discloses an electrode structure and electronics for a positive column plasma display.

Rutherford discloses the use of an isolation bar as an active electrode whereas Weber ('848) discloses an inactive isolation bar.

Both Weber ('848) and Rutherford above are incorporated herein by reference. Additional positive column gas discharge prior art incorporated herein by reference include:

Weber, Larry F., "Positive Column AC Plasma Display". 23$^{rd}$ *International Display Research Conference Proceedings*, Phoenix, Ariz. IDRC 03, (Sep. 16-18, 2003): 119-124

Nagorny et al., "Dielectric Properties and Efficiency of Positive Column AC PDP". 23$^{rd}$ *International Display Research Conference, IDRC* 03, Phoenix, Ariz. (Sep. 16-18, 2003) P-45: 300-303

Drallos et al. "Simulations of AC PDP Positive Column and Cathode Fall Efficiencies". 23$^{rd}$ *International Display Research Conference Proceedings, IDRC* 03, Phoenix, Ariz. (Sep. 16-18, 2003) P-48: 304-306

U.S. Pat. No. 6,376,995 (Kato et al.)
U.S. Pat. No. 6,528,952 (Kato et al.)
U.S. Pat. No. 6,693,389 (Marcotte et al.)
U.S. Pat. No. 6,768,478 (Wani et al.)
U.S. Patent Application Publication 2003/0102812 (Marcotte et al.)
U.S. Pat. No. 7,122,961 (Wedding)
U.S. Pat. No. 7,157,854 (Wedding)

Radio Frequency

The Plasma-tubes may be operated with radio frequency (RF). The RF may especially be used to sustain the plasma discharge. RF may also be used to operate the Plasma-tubes with a positive column discharge. The use of RF in a PDP is disclosed in the following prior art, all incorporated herein by reference: U.S. Pat. Nos. 6,271,810 (Yoo et al.), 6,340,866 (Yoo), 6,473,061 (Lim et al.), 6,476,562 (Yoo et al.), 6,483,489 (Yoo et al.), 6,501,447 (Kang et al.), 6,605,897 (Yoo), 6,624,799 (Kang et al.), 6,661,394 (Choi), and 6,794,820 (Kang et al.).

Shell Materials

The Plasma-tube may be constructed of any suitable material such as glass or plastic as disclosed in the prior art. In the practice of this invention, it is contemplated that the Plasma-tube may be made of any suitable inorganic compounds of metals and/or metalloids, including mixtures or combinations thereof. Contemplated inorganic compounds include the oxides, carbides, nitrides, nitrates, silicates, silicides, aluminates, phosphates, sulfates, sulfides, borides and/or borates.

The metals and/or metalloids are selected from magnesium, calcium, strontium, barium, yttrium, lanthanum, cerium, neodymium, gadolinium, terbium, erbium, thorium, titanium, zirconium, hafnium, vanadium, niobium, tantalum, chromium, molybdenum, tungsten, manganese, rhenium, iron, ruthenium, osmium, cobalt, rhodium, iridium, nickel, copper, silver, zinc, cadmium, boron, aluminum, gallium, indium, thallium, carbon, silicon, germanium, tin, lead, phosphorus, and bismuth.

Inorganic materials suitable for use are magnesium oxide(s), aluminum oxide(s), zirconium oxide(s), and silicon carbide(s) such as MgO, $Al_2O_3$, $ZrO_2$, $SiO_2$, and/or SiC.

In one embodiment of this invention, the Plasma-tube is made of fused particles of glass, ceramic, glass ceramic, refractory, fused silica, quartz, or like amorphous and/or crystalline materials including mixtures of such.

In one preferred embodiment, a ceramic material is selected based on its transmissivity to light after firing. This may include selecting ceramics material with various optical cutoff frequencies to produce various colors. One preferred material contemplated for this application is aluminum oxide. Aluminum oxide is transmissive from the UV range to the IR range. Because it is transmissive in the UV range, phosphors excited by UV may be applied to the exterior of the Plasma-tube to produce various colors. The application of the phosphor to the exterior of the Plasma-tube may be done by any suitable means before or after the Plasma-tube is positioned in the PDP, i.e., on a flexible or rigid substrate. There may be applied several layers or coatings of phosphors, each of a different composition.

In one specific embodiment of this invention, the Plasma-tube is made of an aluminate silicate or contains a layer of aluminate silicate. When the ionizable gas mixture contains helium, the aluminate silicate is especially beneficial in preventing the escaping of helium.

It is also contemplated that the Plasma-tube may be made of lead silicates, lead phosphates, lead oxides, borosilicates, alkali silicates, aluminum oxides, and pure vitreous silica.

For secondary electron emission, the Plasma-tube may be made in whole or in part from one or more materials such as magnesium oxide having a sufficient Townsend coefficient. These include inorganic compounds of magnesium, calcium, strontium, barium, gallium, lead, aluminum, boron, and the rare earths especially lanthanum, cerium, actinium, and thorium. The contemplated inorganic compounds include oxides, carbides, nitrides, nitrates, silicates, silicides, aluminates, phosphates, borates sulphates, sulfides, borides, and other inorganic compounds of the above and other elements.

The Plasma-tube may also contain or be partially or wholly constructed of luminescent materials such as inorganic phosphor(s). The phosphor may be a continuous or discontinuous layer or coating on the interior or exterior of the shell. Phosphor particles may also be introduced inside the Plasma-tube or embedded within the tube. Luminescent quantum dots may also be incorporated into the tube.

Secondary Electron Emission

The use of secondary electron emission (Townsend coefficient) materials in a plasma display is well known in the prior art and is disclosed in U.S. Pat. No. 3,716,742 (Nakayama et al.). The use of Group IIA compounds including magnesium oxide is disclosed in U.S. Pat. Nos. 3,836,393 and 3,846,171. The use of rare earth compounds in an AC plasma display is disclosed in U.S. Pat. Nos. 4,126,807 (Wedding et al.), 4,126,809 (Wedding et al.), and 4,494,038 (Wedding et al.), all incorporated herein by reference. Lead oxide may also be used as a secondary electron material. Mixtures of secondary electron emission materials may be used.

In one embodiment and mode contemplated for the practice of this invention, the secondary electron emission material is magnesium oxide on part or all of the internal surface of a Plasma-tube. The secondary electron emission material may also be on the external surface. The thickness of the magnesium oxide may range from about 250 Angstrom Units to about 10,000 Angstrom Units (Å).

The entire Plasma-tube may be made of a secondary electronic material such as magnesium oxide. A secondary electron material may also be dispersed or suspended as particles within the ionizable gas such as with a fluidized bed. Phosphor particles may also be dispersed or suspended in the gas such as with a fluidized bed, and may also be added to the inner or external surface of the Plasma-tube.

Magnesium oxide increases the ionization level through secondary electron emission that in turn leads to reduced gas discharge voltages. In one embodiment, the magnesium oxide is on the inner surface of the Plasma-tube and the phosphor is located on external surface of the Plasma-tube.

Magnesium oxide is susceptible to contamination. To avoid contamination, gas discharge (plasma) displays are assembled in clean rooms that are expensive to construct and maintain. In traditional plasma panel production, magnesium oxide is applied to an entire open substrate surface and is vulnerable to contamination. The adding of the magnesium oxide layer to the inside of a Plasma-tube minimizes exposure of the magnesium oxide to contamination. The magnesium oxide may be applied to the inside of the Plasma-tube by incorporating magnesium vapor as part of the ionizable gases introduced into the Plasma-tube while the tube is at an elevated temperature. The magnesium may be oxidized while at an elevated temperature.

In some embodiments, the magnesium oxide may be added as particles to the gas. Other secondary electron materials may be used in place of or in combination with magnesium oxide. In one embodiment hereof, the secondary electron material such as magnesium oxide or any other selected material such as magnesium to be oxidized in situ is introduced into the gas by means of a fluidized bed. Other materials such as phosphor particles or vapor may also be introduced into the gas with a fluid bed or other means.

Ionizable Gas

The hollow Plasma-tube as used in the practice of this invention contain(s) one or more ionizable gas components. In the practice of this invention, the gas is selected to emit photons in the visible, IR, and/or UV spectrum.

The UV spectrum is divided into regions. The near UV region is a spectrum ranging from about 340 nm to 450 nm (nanometers). The mid or deep UV region is a spectrum ranging from about 225 nm to 340 nm. The vacuum UV region is a spectrum ranging from about 100 nm to 225 nm. The PDP prior art has used vacuum UV to excite photoluminescent phosphors. In the practice of this invention, it is contemplated using a gas, which provides UV over the entire spectrum ranging from about 100 nm to about 450 nm. The PDP operates with greater efficiency at the higher range of the UV spectrum, such as in the mid UV and/or near UV spectrum. In one preferred embodiment, there is selected a gas which emits gas discharge photons in the near UV range. In another embodiment, there is selected a gas which emits gas discharge photons in the mid UV range. In one embodiment, the selected gas emits photons from the upper part of the mid UV range through the near UV range, about 275 nm to 450 nm.

As used herein, ionizable gas or gas means one or more gas components. In the practice of this invention, the gas is typically selected from a mixture of the noble or rare gases of neon, argon, xenon, krypton, helium, and/or radon. The rare gas may be a Penning gas mixture. Other contemplated gases include nitrogen, $CO_2$, CO, mercury, halogens, excimers, oxygen, hydrogen, and mixtures thereof. Isotopes of the above and other gases are contemplated. These include isotopes of helium such as helium-3, isotopes of hydrogen such as deuterium (heavy hydrogen), tritium ($T^3$) and DT, isotopes of the rare gases such as xenon-129, isotopes of oxygen such as oxygen-18. Other isotopes include deuterated gases such as deuterated ammonia ($ND_3$) and deuterated silane ($SiD_4$).

In one embodiment, a two-component gas mixture (or composition) is used such as a mixture of neon and argon, neon and xenon, neon and helium, neon and krypton, neon and radon, argon and xenon, argon and krypton, argon and helium, argon and radon, xenon and krypton, xenon and helium, xenon and radon, krypton and helium, krypton and radon, and helium and radon. Specific two-component gas mixtures (compositions) include about 1% to 90% atoms of argon with the balance xenon. Another two-component gas mixture is a mother gas of neon containing 0.01% to 25% atoms of xenon, argon, or krypton. This can also be a three-component gas, four-component gas, or five-component gas by using quantities of an additional gas or gases selected from xenon, argon, krypton, and/or helium. In another embodiment, a three-component ionizable gas mixture is used such as a mixture of argon, xenon, and neon wherein the mixture contains at least 5% to 80% atoms of argon, up to 15% xenon, and the balance neon. The xenon is present in a minimum amount sufficient to maintain the Penning effect. Such a mixture is disclosed in U.S. Pat. No. 4,926,095 (Shinoda et al.), incorporated herein by reference. Other three-component gas mixtures include argon-helium-xenon; krypton-neon-xenon; and krypton-helium-xenon, for example, as disclosed in U.S. Pat. Nos. 5,510,678 (Sakai et al.) and 5,559,403 (Sakai et al.), both incorporated herein by reference.

U.S. Pat. No. 4,081,712 (Bode et al.), incorporated herein by reference, discloses the addition of helium to a gaseous medium of 90% to 99.99% atoms of neon and 10% to 0.01% atoms of argon, xenon, and/or krypton. In one embodiment, there is used a high concentration of helium with the balance selected from one or more gases of neon, argon, xenon, and nitrogen as disclosed in U.S. Pat. No. 6,285,129 (Park) and incorporated herein by reference. Mercury may be added to the rare gas as disclosed in U.S. Pat. No. 4,041,345 (Sahni), incorporated herein by reference.

A high concentration of xenon may also be used with one or more other gases as disclosed in U.S. Pat. No. 5,770,921 (Aoki et al.), incorporated herein by reference. Pure neon may be used and the Plasma tubes operated without memory margin using the architecture disclosed by U.S. Pat. No. 3,958,151 (Yano) discussed above and incorporated herein by reference.

Excimers

Excimer gases may also be used as disclosed in U.S. Pat. Nos. 4,549,109 (Nighan et al.) and 4,703,229 (Nighan et al.), both incorporated herein by reference. Nighan et al. ('109) and ('229) disclose the use of excimer gases formed by the combination of halogens with rare gases. The halogens include fluorine, chlorine, bromine and iodine. The rare gases include helium, xenon, argon, neon, krypton and radon. Excimer gases may emit red, blue, green, or other color light in the visible range or light in the invisible range. The excimer gases may be used alone or in combination with phosphors. U.S. Pat. No. 6,628,088 (Kim et al.), incorporated herein by reference, also discloses excimer gases for a PDP.

Other Gases

Depending upon the application, a wide variety of gases are contemplated for the practice of this invention. Such other applications include gas-sensing devices for detecting radiation and radar transmissions. Such other gases include $C_2H_2$—$CF_4$—Ar mixtures as disclosed in U.S. Pat. Nos. 4,201,692 (Christophorou et al.) and 4,309,307 (Christophorou et al.), both incorporated herein by reference. Also contemplated are gases disclosed in U.S. Pat. No. 4,553,062 (Ballon et al.), incorporated herein by reference. Other gases include sulfur hexafluoride, HF, $H_2S$, $SO_2$, SO, $H_2O_2$, and so forth.

Gas Pressure

This invention allows the construction and operation of a gas discharge (plasma) display with gas pressures at or above one atmosphere. In the prior art, gas discharge (plasma) displays are operated with the ionizable gas at a pressure below atmospheric. Gas pressures above atmospheric are not used in the prior art because of structural problems. Higher gas pressures above atmospheric may cause the display substrates to separate, especially at elevations of 4,000 feet or more above sea level. Such separation may also occur between the substrate and a viewing envelope or dome in a single substrate or monolithic plasma panel structure.

In the practice of this invention, the gas pressure inside of the hollow Plasma-tube may be equal to or less than atmospheric pressure or may be equal to or greater than atmospheric pressure. The typical sub-atmospheric pressure is about 150 to 760 Torr. However, pressures above atmospheric may be used depending upon the structural integrity of the Plasma-tube.

In one embodiment of this invention, the gas pressure inside of the Plasma-tube is equal to or less than atmospheric, about 150 to 760 Torr, typically about 350 to about 650 Torr.

In another embodiment of this invention, the gas pressure inside of the Plasma-tube is equal to or greater than atmospheric. Depending upon the structural strength of the Plasma-tube, the pressure above atmospheric may be about 1 to 250 atmospheres (760 to 190,000 Ton) or greater. Higher gas pressures increase the luminous efficiency of the plasma display.

Gas Processing

This invention avoids the costly prior art gas filling techniques used in the manufacture of gas discharge (plasma) display devices. The prior art introduces gas through one or more apertures into the device requiring a gas injection hole and tube. The prior art manufacture steps typically include heating and baking out the assembled device (before gas fill) at a high-elevated temperature under vacuum for 2 to 12 hours. The vacuum is obtained via external suction through a tube inserted in an aperture.

The bake out is followed by back fill of the entire panel with an ionizable gas introduced through the tube and aperture. The tube is then sealed-off.

This bake out and gas fill process is a major production bottleneck and yield loss in the manufacture of gas discharge (plasma) display devices, requiring substantial capital equipment and a large amount of process time. For color AC plasma display panels of 40 to 50 inches in diameter, the bake out and vacuum cycle may be 10 to 30 hours per panel or 10 to 30 million hours per year for a manufacture facility producing over 1 million plasma display panels per year.

The gas filled Plasma-tubes used in this invention can be produced in large economical volumes and added to the gas discharge (plasma) display device without the necessity of costly bake out and gas process capital equipment. The savings in capital equipment cost and operations costs are substantial. Also the entire PDP does not have to be gas processed with potential yield loss at the end of the PDP manufacture.

PDP Structure

In one embodiment, the Plasma-tubes are located on or in a single substrate or monolithic PDP structure. Single substrate PDP structures are disclosed in U.S. Pat. Nos. 3,646,384 (Lay), 3,652,891 (Janning), 3,666,981 (Lay), 3,811,061 (Nakayama et al.), 3,860,846 (Mayer), 3,885,195 (Amano), 3,935,494 (Dick et al.), 3,964,050 (Mayer), 4,106,009 (Dick), 4,164,678 (Biazzo et al.), and 4,638,218 (Shinoda), all cited above and incorporated herein by reference. The Plasma-tubes may be positioned on the surface of the substrate and/or positioned in the substrate such as in channels, trenches, grooves, wells, cavities, hollows, and so forth. These channels, trenches, grooves, wells, cavities, hollows, etc., may extend through the substrate so that the Plasma-tubes positioned therein may be viewed from either side of the substrate.

The Plasma-tubes may also be positioned on or in a substrate within a dual substrate plasma display structure. Each tube is placed inside of a gas discharge (plasma) display device, for example, on the substrate along the channels, trenches or grooves between the barrier walls of a plasma display barrier structure such as disclosed in U.S. Pat. Nos. 5,661,500 (Shinoda et al.), 5,674,553 (Shinoda et al.), and 5,793,158 (Wedding), cited above and incorporated herein by reference. The Plasma-tubes may also be positioned within a cavity, well, hollow, concavity, or saddle of a plasma display substrate, for example as disclosed by U.S. Pat. No. 4,827,186 (Knauer et al.), incorporated herein by reference.

In a device as disclosed by Wedding ('158) or Shinoda et al. ('500), the Plasma-tubes may be conveniently added to the substrate cavities and the space between opposing electrodes before the device is sealed. An aperture and tube can be used for bake out if needed of the space between the two opposing substrates, but the costly gas fill operation is eliminated.

The gas filled Plasma-tubes used in this invention can be produced in large economical volumes and added to the gas discharge (plasma) display device without the necessity of bake out and gas process capital equipment. The savings in capital equipment cost and operations costs are substantial.

In one embodiment, the Plasma-tubes are conveniently added to the gas discharge space between opposing electrodes before the device is sealed. The presence of the Plasma-tubes inside of the display device add structural support and integrity to the device. The present color AC plasma displays of 40 to 50 inches are fragile and are subject to breakage during shipment and handling.

The length of each Plasma-tube may vary depending upon the PDP structure. In one embodiment hereof, an elongated tube is selectively divided into a multiplicity of lengths in the shape or form of micro-size cylinders for gas discharge display units. In one embodiment, the PDP is comprised of a multiplicity of parallel tubes. In another embodiment, the PDP is comprised of a continuous single Plasma-tube, which winds or weaves back and forth from one end to the other end of the PDP.

The Plasma-tubes may be sprayed, stamped, pressed, poured, screen-printed, or otherwise applied to the substrate. The substrate surface may contain an adhesive or sticky surface to bind the Plasma-tube to the substrate.

The practice of this invention is not limited to a flat surface display. The Plasma-tube may be positioned or located on a conformal surface or substrate so as to conform to a predetermined shape such as a curved or irregular surface.

In one embodiment of this invention, each Plasma-tube is positioned within a cavity on a single-substrate or monolithic gas discharge structure that has a flexible or bendable substrate. In another embodiment, the substrate is rigid. The substrate may also be partially or semi-flexible.

Substrate

In accordance with various embodiments of this invention, the PDP may be comprised of a single substrate or dual substrate device with flexible, semi-flexible, or rigid substrates. The substrate may be opaque, transparent, translucent, or non-light transmitting. In some embodiments, there may be used multiple substrates of three or more. Substrates may be flexible films, such as a polymeric film substrate. The flexible substrate may also be made of metallic materials alone or incorporated into a polymeric substrate. Alternatively or in addition, one or both substrates may be made of an optically transparent thermoplastic polymeric material. Examples of suitable such materials are polycarbonate, polyvinyl chloride, polystyrene, polymethyl methacrylate, polyurethane polyimide, polyester, and cyclic polyolefin polymers. More broadly, the substrates may include a flexible plastic such as a material selected from the group consisting of polyether sulfone (PES), polyester terephihalate, polyethylene terephihalate (PET), polyethylene naphtholate, polycarbonate, polybutylene terephihalate, polyphenylene sulfide (PPS), polypropylene, polyester, aramid, polyamide-imide (PAI), polyimide, aromatic polyimides, polyetherimide, acrylonitrile butadiene styrene, and polyvinyl chloride, as disclosed in U.S. Patent Application Publication 2004/0179145 (Jacobsen et al.), incorporated herein by reference.

Alternatively, one or both of the substrates may be made of a rigid material. For example, one or both of the substrates may be a glass substrate. The glass may be a conventionally available glass, for example having a thickness of approximately 0.2 mm-1 mm. Alternatively; other suitable transparent materials may be used, such as a rigid plastic or a plastic film. The plastic film may have a high glass transition temperature, for example above 65° C., and may have a transparency greater than 85% at 530 nm.

Further details regarding substrates and substrate materials may be found in International Publications Nos. WO 00/46854, WO 00/49421, WO 00/49658, WO 00/55915, and WO 00/55916, the entire disclosures of which are herein incorporated herein by reference. Apparatus, methods, and compositions for producing flexible substrates are disclosed in U.S. Pat. Nos. 5,469,020 (Herrick), 6,274,508 (Jacobsen et al.), 6,281,038 (Jacobsen et al.), 6,316,278 (Jacobsen et al.), 6,468,638 (Jacobsen et al.), 6,555,408 (Jacobsen et al.), 6,590,346 (Hadley et al.), 6,606,247 (Credelle et al.), 6,665,044 (Jacobsen et al.), and 6,683,663 (Hadley et al.), all of which are incorporated herein by reference.

Positioning of Plasma-Tube on Substrate

The Plasma-tube may be positioned or located on the substrate by any appropriate means. In one embodiment of this invention, the Plasma-tube is bonded to the surface of a monolithic or dual-substrate display such as a PDP. The Plasma-tube is bonded to the substrate surface with a non-conductive, adhesive material, which also serves as an insulating barrier to prevent electrically shorting of the conductors or electrodes connected to the Plasma-tube.

The Plasma-tube may be mounted or positioned within a substrate well, cavity, hollow, or like depression. The well, cavity, hollow or depression is of suitable dimensions with a mean or average diameter and depth for receiving and retaining the Plasma-tube. As used herein well includes cavity, hollow, depression, hole, or any similar configuration. In U.S. Pat. No. 4,827,186 (Knauer et al.), there is shown a cavity referred to as a concavity or saddle. The depression, well or cavity may extend partly through the substrate, embedded within or extend entirely through the substrate. The cavity may comprise an elongated channel, trench, or groove extending partially or completely across the substrate.

The electrodes must be in direct contact with each Plasma-tube. An air gap between an electrode and the Plasma-tube will cause high operating voltages. A material such as a conductive adhesive, and/or a conductive filler may be used to bridge or connect the electrode to the Plasma-tube. Such conductive material must be carefully applied so as to not electrically short the electrode to other nearby electrodes. A dielectric material may also be applied to fill any air gap. This also may be an adhesive, etc.

Insulating Barrier

The insulating barrier may comprise any suitable non-conductive material, which may also be used to bond the Plasma-tube to the substrate.

In one embodiment, there is used an epoxy resin that is the reaction product of epichlorohydrin and bisphenol-A. One such epoxy resin is a liquid epoxy resin, D.E.R. 383, produced by the Dow Plastics group of the Dow Chemical Company.

Light Barriers

Impervious light barriers of opaque or non-transparent material may be located between Plasma-tubes to minimize or prevent optical cross talk between the discharge cells or pixels in Plasma-tubes, particularly between the discharge cells in adjacent Plasma-tubes. A black material such as carbon filler is typically used.

Electrically Conductive Bonding Substance

In the practice of this invention, the conductors or electrodes are electrically connected to each Plasma-tube with an electrically conductive bonding substance. The electrically conductive bonding substance can be any suitable inorganic or organic material including compounds, mixtures, dispersions, pastes, liquids, cements, and adhesives.

In one embodiment, the electrically conductive bonding substance is an organic substance with conductive filler material. Contemplated organic substances include adhesive monomers, dimers, trimers, polymers and copolymers of materials such as polyurethanes, polysulfides, silicones, and epoxies. A wide range of other organic or polymeric materials may be used.

Contemplated conductive filler materials include conductive metals or metalloids such as silver, gold, platinum, copper, chromium, nickel, aluminum, and carbon. The conductive filler may be of any suitable size and form such as particles, powder, agglomerates, or flakes of any suitable size and shape. It is contemplated that the particles, powder, agglomerates, or flakes may comprise a non-metal, metal, or metalloid core with an outer layer, coating, or film of conductive metal. Some specific embodiments of conductive filler materials include silver-plated copper beads, silver-plated glass beads, silver particles, silver flakes, gold-plated copper beads, gold-plated glass beads, gold particles, gold flakes, and so forth. In one particular embodiment of this invention there is used an epoxy filled with 60% to 80% by weight silver.

Examples of electrically conductive bonding substances are well known in the art. The disclosures including the compositions of the following references are incorporated herein by reference. U.S. Pat. No. 3,412,043 (Gilliland) discloses an electrically conductive composition of silver flakes and resinous binder. U.S. Pat. No. 3,983,075 (Marshall et al.) discloses a copper filled electrically conductive epoxy. U.S. Pat. No. 4,247,594 (Shea et al.) discloses an electrically conductive resinous composition of copper flakes in a resinous binder. U.S. Pat. Nos. 4,552,607 (Frey) and 4,670,339 (Frey) disclose a method of forming an electrically conductive bond using copper microspheres in an epoxy. U.S. Pat. No. 4,880,570 (Sanborn et al.) discloses an electrically conductive epoxy-based adhesive selected from the amine curing modified epoxy family with a filler of silver flakes. U.S. Pat. No. 5,183,593 (Durand et al.) discloses an electrically conductive cement comprising a polymeric carrier such as a mixture of two epoxy resins and filler particles selected from silver agglomerates, particles, flakes, and powders. The filler may be silver-plated particles such as inorganic spheroids plated with silver. Other noble metals and non-noble metals such as nickel are disclosed. U.S. Pat. No. 5,298,194 (Carter et al.) discloses an electrically conductive adhesive composition comprising a polymer or copolymer of polyolefins or polyesters filled with silver particles. U.S. Pat. No. 5,575,956 (Hermansen et al.) discloses electrically-conductive, flexible epoxy adhesives comprising a polymeric mixture of a polyepoxide resin and an epoxy resin filled with conductive metal powder, flakes, or non-metal particles having a metal outer coating. The conductive metal is a noble metal such as gold, silver, or platinum. Silver-plated copper beads and silver-plated glass beads are also disclosed. U.S. Pat. No. 5,891,367 (Basheer et al.) discloses a conductive epoxy adhesive comprising an epoxy resin cured or reacted with selected primary amines and filled with silver flakes. The primary amines provide improved impact resistance. U.S. Pat. No. 5,918,364 (Kulesza et al.) discloses substrate bumps or pads formed of electrically conductive polymers filled with gold or silver. U.S. Pat. No. 6,184,280 (Shibuta) discloses an organic polymer containing hollow carbon microfibers and an electrically conductive metal oxide powder. In another embodiment, the electrically conductive bonding substance is an organic substance without a conductive filler material.

Examples of electrically conductive bonding substances are well known in the art. The disclosures including the compositions of the following references are incorporated herein by reference. U.S. Pat. No. 5,645,764 (Angelopoulos et al.) discloses electrically conductive pressure sensitive polymers without conductive fillers. Examples of such polymers include electrically conductive substituted and unsubstituted polyanilines, substituted and unsubstituted polyparaphenylenes, substituted and unsubstituted polyparaphenylene vinylenes, substituted and unsubstituted polythiophenes, substituted and unsubstituted polyazines, substituted and unsubstituted polyfuranes, substituted and unsubstituted polypyrroles, substituted and unsubstituted polyselenophenes, substituted and unsubstituted polyphenylene sulfides and substituted and unsubstituted polyacetylenes formed from soluble precursors. Blends of these polymers are suitable for use as are copolymers made from the monomers, dimers, or trimers, used to form these polymers. Electrically conductive polymer compositions are also disclosed in U.S. Pat. Nos. 5,917,693 (Kono et al.), 6,096,825 (Garnier), and 6,358,438 (Isozaki et al.). The electrically conductive polymers disclosed above may also be used with conductive fillers.

In some embodiments, organic ionic materials such as calcium stearate may be added to increase electrical conductivity. See U.S. Pat. No. 6,599,446 (Todt et al.), incorporated herein by reference.

In one embodiment hereof, the electrically conductive bonding substance is luminescent, for example as disclosed in U.S. Pat. No. 6,558,576 (Brielmann et al.), incorporated herein by reference.

EMI/RFI Shielding

In some embodiments, electroductive bonding substances may be used for EMI (electromagnetic interference) and/or RFI (radio-frequency interference) shielding. Examples of such EMI/RFI shielding are disclosed in U.S. Pat. Nos. 5,087, 314 (Sandborn et al.) and 5,700,398 (Angelopoulos et al.), both incorporated herein by reference.

Electrodes

One or more hollow Plasma-tubes containing the ionizable gas are located within the display panel structure, each Plasma-tube being in contact with at least two electrodes. In accordance with this invention, the contact is made by an electrically conductive bonding substance applied to each tube so as to form an electrically conductive pad for connection to the electrodes. A dielectric substance may also be used in lieu of or in addition to the conductive substance. Each electrode pad may partially cover the outside shell surface of the Plasma-tube. The electrodes and pads may be of any geometric shape or configuration. In one embodiment the electrodes are opposing arrays of electrodes, one array of electrodes being transverse or orthogonal to an opposing array of electrodes. The electrode arrays can be parallel, zigzag, serpentine, or like pattern as typically used in dot-matrix gas discharge (plasma) displays. The use of split or divided electrodes is contemplated as disclosed in U.S. Pat. Nos. 3,603,836 (Grier) and 3,701,184 (Grier), incorporated herein by reference. Apertured electrodes may be used as disclosed in U.S. Pat. Nos. 6,118,214 (Marcotte) and 5,411,035 (Marcotte) and U.S. Patent Application Publication 2004/0001034 (Marcotte), all incorporated herein by reference. The electrodes are of any suitable conductive metal or alloy including gold, silver, aluminum, or chrome-copper-chrome. If a transparent electrode is used on the viewing surface, this is typically indium tin oxide (ITO) or tin oxide with a conductive side or edge bus bar of silver. Other conductive bus bar materials may be used such as gold, aluminum, or chrome-copper-chrome. The electrodes may partially cover the external surface of the Plasma-tube.

The electrode array may be divided into two portions and driven from both sides with a so-called dual scan architecture as disclosed by U.S. Pat. Nos. 4,233,623 (Pavliscak) and 4,320,418 (Pavliscak), both incorporated herein by reference.

A flat Plasma-tube surface is particularly suitable for connecting electrodes to the Plasma-tube. If one or more electrodes connect to the bottom of Plasma-tube, a flat bottom surface is desirable. Likewise, if one or more electrodes connect to the top or sides of the Plasma-tube, it is desirable for the connecting surface of such top or sides to be flat.

The electrodes may be applied to the substrate or to the Plasma-tubes by thin film methods such as vapor phase deposition, E-beam evaporation, sputtering, conductive doping, etc. or by thick film methods such as screen printing, ink jet printing, etc.

In a matrix display, the electrodes in each opposing transverse array are transverse to the electrodes in the opposing array so that each electrode in each array forms a crossover with an electrode in the opposing array, thereby forming a multiplicity of crossovers. Each crossover of two opposing electrodes forms a discharge point or cell. At least one hollow Plasma-tube containing ionizable gas is positioned in the gas discharge (plasma) display device at the intersection of at least two opposing electrodes. When an appropriate voltage potential is applied to an opposing pair of electrodes, the ionizable gas inside of the Plasma-tube at the crossover is energized and a gas discharge occurs. Photons of light in the visible and/or invisible range are emitted by the gas discharge. These may be used to excite a luminescent material located inside or outside the shell of the Plasma-tube or Plasma-shell.

Shell Geometry

The shell of the Plasma-tubes may be of any suitable volumetric shape or geometric configuration to encapsulate the ionizable gas independently of the PDP or PDP substrate. The tube cross-section may be of any suitable geometric design. The cross section as shown in FIG. 1A is rectangular. However, this may be of any geometric cross section including square, circular, elliptical, triangular, polygonal, trapezoidal, and so forth. If a Plasma-shell is used, the volumetric and geometric shapes of the Plasma-shell include but are not limited to spherical, oblate spheroid, prolate spheroid, capsular, elliptical, ovoid, egg shape, bullet shape, pear and/or tear drop. In an oblate spheroid, the diameter at the polar axis is flattened and is less than the diameter at the equator. In a prolate spheroid, the diameter at the equator is less than the diameter at the polar axis such that the overall shape is elongated. Likewise, the shell cross-section may be of any geometric design.

The diameter of the Plasma-tubes used in the practice of this invention may vary over a wide range. In a gas discharge display, the average diameter of a Plasma-tube is about 1 mil to 20 mils (where one mil equals 0.001 inch) or about 25 microns to 500 microns where 25.4 microns (micrometers) equals 1 mil or 0.001 inch. Plasma-tubes can be manufactured up to 80 mils or about 2000 microns in diameter or greater. The thickness of the wall of each hollow Plasma-tube must be sufficient to retain the gas inside, but thin enough to allow passage of photons emitted by the gas discharge. The wall thickness of the Plasma-tube should be kept as thin as practical to minimize photon absorption, but thick enough to retain sufficient strength so that the Plasma-tubes can be easily handled and pressurized. Typically the Plasma-tube shell thickness is about 1% to 20% of the external width or diameter of the tube shell.

The average diameter of the Plasma-tubes may be varied for different phosphors to achieve color balance. Thus for a gas discharge display having phosphors which emit red, green, and blue light in the visible range, the Plasma-tubes for the red phosphor may have an average diameter less than the average diameter of the Plasma-tubes for the green or blue phosphor. Typically the average diameter of the red phosphor Plasma-tubes is about 80% to 95% of the average diameter of the green phosphor Plasma-tubes.

The average diameter of the blue phosphor Plasma-tubes may be greater than the average diameter of the red or green phosphor Plasma-tubes. Typically the average Plasma-tube diameter for the blue phosphor is about 105% to 125% of the average Plasma-tube diameter for the green phosphor and about 110% to 155% of the average diameter of the red phosphor.

In another embodiment using a high brightness green phosphor, the red and green Plasma-tube may be reversed such that the average diameter of the green phosphor Plasma-tube is about 80 to 95% of the average diameter of the red phosphor Plasma-tube. In this embodiment, the average diameter of the blue Plasma-tube is 105% to 125% of the average Plasma-tube diameter for the red phosphor and about 110% to 155% of the average diameter of the green phosphor.

The red, green, and blue Plasma-tubes may also have different size diameters so as to enlarge voltage margin and improve luminance uniformity as disclosed in U.S. Patent Application Publication 2002/0041157 A1 (Heo), incorporated herein by reference. The widths of the corresponding electrodes for each RGB Plasma-tube may be of different dimensions such that an electrode is wider or narrower for a selected phosphor as disclosed in U.S. Pat. No. 6,034,657

(Tokunaga et al.), incorporated herein by reference. There also may be used combinations of different geometric shapes for different colors. Thus there may be used a square cross section Plasma-tube for one color, a circular cross-section for another color, and another geometric cross section such as triangular for a third color. A combination of Plasma-tubes of different geometric shapes may be used. Multiple Plasma-tubes of one color may be used such as two or more consecutive Plasma-tubes of blue, red, or green.

Phosphor

The photons of light produced by the gas discharge within the Plasma-tube excite a luminescent material such as a phosphor located inside or outside of the tube. This phosphor may be located on the side wall(s) of a channel, groove, cavity, well, hollow or like structure of the discharge space. In one best embodiment and mode contemplated in the practice of this invention, a layer, coating, or particles of phosphor is located on or near the exterior wall of the Plasma-tube as shown in the drawings.

The gas discharge within the Plasma-tube produces photons that excite the phosphor such that the phosphor emits light in a range visible to the human eye. Typically this is red, blue, or green light. However, phosphors may be used which emit other light such as white, pink or yellow light. In some applications of this invention, the phosphor may produce IR and/or UV photons.

In prior art AC plasma displays as disclosed in Wedding ('158), the phosphor is located on the wall(s) or side(s) of the barriers that form the channel, groove, cavity, well, or hollow, The phosphor may also be located on the bottom of the channel, or groove as disclosed by Shinoda et al. ('500) or the bottom cavity, well, or hollow as disclosed by Knauer et al. ('186).

In one embodiment of this invention, Plasma-tubes are positioned within the channel, groove, cavity, well, or hollow, such that photons from the gas discharge within the tube causes the phosphor along the wall(s), side(s) or at the bottom of the channel, groove, cavity, well, or hollow, to emit light.

In another embodiment of this invention, phosphor is located near or on the outside surface of each Plasma-tube as shown in FIG. 1. In this embodiment, the outside surface is at least partially covered with phosphor that emits light when excited by photons from the gas discharge within the Plasma-tube.

In one embodiment, phosphor particles are dispersed and/or suspended within the ionizable gas inside each Plasma-tube. In such embodiment the phosphor particles are sufficiently small such that most of the phosphor particles remain suspended within the gas and do not precipitate or otherwise substantially collect on the inside wall of the Plasma-tube. The mean diameter of the dispersed and/or suspended phosphor particles is less than about 1 micron, typically less than 0.1 microns. Larger particles can be used depending on the size of the Plasma-tube.

In the practice of this invention, the Plasma-tube may be color tinted or constructed of materials that are color tinted with red, blue, green, yellow, or like pigments. Color tinting is disclosed in U.S. Pat. No. 4,035,690 (Roeber), incorporated herein by reference. The gas discharge may also emit color light of different wavelengths as disclosed in Roeber ('690).

The use of tinted materials and/or gas discharges emitting light of different wavelengths may be customized for each Plasma-tube and used in combination with the above described phosphors and the light emitted therefrom. Optical filters may also be used.

The luminescent phosphor may be located on all or part of the external surface of the tube or on all or part of the internal surface of the tube. The phosphor may also be particles dispersed or floating within the gas. In one embodiment contemplated for the practice of this invention, the phosphor is on the external surface of the Plasma-tube.

The photoluminescent phosphor is excited by ultraviolet (UV) photons from the gas discharge and emits light in the visible range such as red, blue, or green light. Phosphors may be selected to emit light of other colors such as white, pink, or yellow. The phosphor may also be selected to emit light in non-visible ranges of the spectrum. Optical filters may be selected and matched with different phosphors.

Green Phosphor

A green light-emitting luminescent material such as a phosphor may be used alone or in combination with other light-emitting phosphors such as blue or red. Phosphor materials which emit green light include $Zn_2SiO_4$:Mn, ZnS:Cu, ZnS:Au, ZnS:A1, ZnO:Zn, CdS:Cu, CdS:$Al_2$, $Cd_2O_2S$:Tb, and $Y_2O_2S$:Tb.

In one mode and embodiment of this invention using a green light-emitting phosphor, there is used a green light-emitting phosphor selected from the zinc orthosilicate phosphors such as $ZnSiO_4$:$Mn^{2+}$. Green light emitting zinc orthosilicates including the method of preparation are disclosed in U.S. Pat. No. 5,985,176 (Rao), which is incorporated herein by reference. These phosphors have a broad emission in the green region when excited by 147 nm and 173 nm (nanometers) radiation from the discharge of a xenon gas mixture.

In another mode and embodiment of this invention there is used a green light-emitting phosphor which is a terbium activated yttrium gadolinium borate phosphor such as (Gd,Y)$BO_3$:$Tb^{3+}$. Green light-emitting borate phosphors including the method of preparation are disclosed in U.S. Pat. No. 6,004,481 (Rao), which is incorporated herein by reference.

In another mode and embodiment there is used a manganese activated alkaline earth aluminate green phosphor as disclosed in U.S. Pat. No. 6,423,248 (Rao), peaking at 516 nm when excited by 147 nm and 173 nm radiation from xenon. The particle size ranges from 0.05 to 5 microns. Rao ('248) is incorporated herein by reference Terbium doped phosphors may emit in the blue region especially in lower concentrations of terbium. For some display applications such as television, it is desirable to have a single peak in the green region at 543 nm. By incorporating a blue absorption dye in a filter, any blue peak can be eliminated.

Green light-emitting terbium-activated lanthanum cerium orthophosphate phosphors are disclosed in U.S. Pat. No. 4,423,349 (Nakajima et al.), which is incorporated herein by reference. Green light-emitting lanthanum cerium terbium phosphate phosphors are disclosed in U.S. Pat. No. 5,651,920 (Chau et al.), incorporated herein by reference.

Green light-emitting phosphors may also be selected from the trivalent rare earth ion-containing aluminate phosphors as disclosed in U.S. Pat. No. 6,290,875 (Oshio et al.).

Blue Phosphor

A blue light-emitting phosphor may be used alone or in combination with other light-emitting phosphors such as green or red. Phosphor materials which emit blue light include ZnS:Ag, ZnS:C1, and CsI:Na.

In a preferred mode and embodiment of this invention, there is used a blue light-emitting aluminate phosphor. An aluminate phosphor which emits blue visible light is divalent europium ($Eu^{2+}$) activated Barium Magnesium Aluminate (BAM) represented by $BaMgAl_{10}O_{17}:Eu^{2+}$. BAM is widely used as a blue phosphor in the PDP industry.

BAM and other aluminate phosphors which emit blue visible light are disclosed in U.S. Pat. Nos. 5,611,959 (Kijima et al.) and 5,998,047 (Bechtel et al.), both incorporated herein by reference. The aluminate phosphors may also be selectively coated as disclosed by Bechtel et al. ('047).

Blue light-emitting phosphors may be selected from a number of divalent europium-activated aluminates such as disclosed in U.S. Pat. No. 6,096,243 (Oshio et al.) incorporated herein by reference.

In another mode and embodiment of this invention, the blue light-emitting phosphor is thulium activated lanthanum phosphate with trace amounts of $Sr^{2+}$ and/or $Li^+$. This exhibits a narrow band emission in the blue region peaking at 453 nm when excited by 147 nm and 173 nm radiation from the discharge of a xenon gas mixture. Blue light-emitting phosphate phosphors including the method of preparation are disclosed in U.S. Pat. No. 5,989,454 (Rao), which is incorporated herein by reference.

In a best mode and embodiment of this invention using a blue light-emitting phosphor, a mixture or blend of blue emitting phosphors is used such as a blend or complex of about 85% to 70% by weight of a lanthanum phosphate phosphor activated by trivalent thulium ($Tm^{3+}$), $Li^+$, and an optional amount of an alkaline earth element ($AE^{2+}$) as a coactivator and about 15% to 30% by weight of divalent europium-activated BAM phosphor or divalent europium-activated Barium Magnesium, Lanthanum Aluminated (BLAMA) phosphor. Such a mixture is disclosed in U.S. Pat. No. 6,187,225 (Rao), incorporated herein by reference.

Blue light-emitting phosphors also include $ZnO.Ga_2O_3$ doped with Na or Bi. The preparation of these phosphors is disclosed in U.S. Pat. Nos. 6,217,795 (Yu et al.) and 6,322,725 (Yu et al.), both incorporated herein by reference.

Other blue light-emitting phosphors include europium activated strontium chloroapatite and europium-activated strontium calcium chloroapatite.

Red Phosphor

A red light-emitting phosphor may be used alone or in combination with other light-emitting phosphors such as green or blue. Phosphor materials which emit red light include $Y_2O_2S:Eu$ and $Y_2O_3S:Eu$.

In a best mode and embodiment of this invention using a red light-emitting phosphor, there is used a red light-emitting phosphor which is an europium activated yttrium gadolinium borate phosphors such as $(Y,Gd)BO_3:Eu^{3+}$. The composition and preparation of these red light-emitting borate phosphors is disclosed in U.S. Pat. Nos. 6,042,747 (Rao) and 6,284,155 (Rao), both incorporated herein by reference.

These europium activated yttrium, gadolinium borate phosphors emit an orange line at 593 nm and red emission lines at 611 nm and 627 nm when excited by 147 nm and 173 nm UV radiation from the discharge of a xenon gas mixture. For television (TV) applications, it is preferred to have only the red emission lines (611 nm and 627 nm). The orange line (593 nm) may be minimized or eliminated with an external optical filter.

A wide range of red light-emitting phosphors is used in the PDP industry and is contemplated in the practice of this invention including europium-activated yttrium oxide.

Other Phosphors

There also may be used phosphors other than red, blue, green such as a white light-emitting phosphor, pink light-emitting phosphor or yellow light-emitting phosphor. These may be used with an optical filter.

Phosphor materials which emit white light include calcium compounds such as $3Ca_3(PO_4)_2.CaF:Sb$, $3Ca_3(PO_4)_2.CaF:Mn$, $3Ca_3(PO_4)_2.CaCl:Sb$, and $3Ca_3(PO_4)_2.CaCl:Mn$.

White light-emitting phosphors are disclosed in U.S. Pat. No. 6,200,496 (Park et al.) incorporated herein by reference.

Pink light-emitting phosphors are disclosed in U.S. Pat. No. 6,200,497 (Park et al.) incorporated herein by reference. Phosphor material which emits yellow light include ZnS:Au.

In one embodiment of this invention it is contemplated using a phosphor to convert infrared radiation to visible light. This is referred to in the literature as an up-conversion phosphor. The up-conversion phosphor is typically used as a layer in combination with a phosphor, which converts UV radiation to visible light. An up-conversion phosphor is disclosed in U.S. Pat. No. 6,265,825 (Asano) incorporated herein by reference.

The phosphor thickness is sufficient to absorb the UV, but thin enough to emit light with minimum attenuation. Typically the phosphor thickness is about 2 to 40 microns, preferably about 5 to 15 microns.

The dispersed or floating particles within the gas are typically spherical or needle shaped having an average size of about 0.01 to 5 microns.

The photoluminescent phosphor is excited by UV in the range of 50 to 400 nanometers. The phosphor may have a protective layer or coating which is transmissive to the excitation UV and the emitted visible light. Such include aluminum oxide or silica. Protective coatings are disclosed in Wedding ('158).

Up-conversion

In another embodiment of this invention it is contemplated using a luminescent substance such as a Stokes phosphor for up-conversion, for example to convert infrared (IR) radiation to visible light. Up-conversion or Stokes materials include phosphors as disclosed in U.S. Pat. Nos. 3,623,907 (Watts), 3,634,614 (Geusic), 5,541,012 (Ohwaki et al.), 6,265,825 (Asano), and 6,624,414 (Glesener), all incorporated herein by reference. Up-conversion may also be obtained with shell compositions such as thulium doped silicate glass containing oxides of Si, Al, and La, as disclosed in U.S. Patent Application Publication 2004/0037538 (Schardt et al.), incorporated herein by reference. The glasses of Schardt et al. emit visible or UV light when excited by IR. Glasses for up-conversion are also disclosed in Japanese Patents 9054562 and 9086958 (Akira et al.), both incorporated herein by reference.

U.S. Pat. No. 5,166,948 (Gavrilovic) discloses an up-conversion crystalline structure. U.S. Pat. No. 6,726,992 (Yadav et al.) discloses nano-engineered luminescent substances including both Stokes and Anti-Stokes down-conversion phosphors. It is contemplated that the Plasma-tube may be constructed wholly or in part from an up-conversion, down-conversion material or a combination of both.

Down-conversion

The luminescent substance may also include down-conversion (Anti-Stokes) materials such as phosphors as disclosed in U.S. Pat. No. 3,838,307 (Masi), incorporated herein by reference. Down-conversion luminescent substances are also disclosed in U.S. Pat. Nos. 6,013,538 (Burrows et al.), 6,091,195 (Forrest et al.), 6,208,791 (Bischel et al.), 6,566,156 (Sturm et al. and 6,650,045 Forrest et al.). Down-conversion luminescent substances are also disclosed in U.S. Patent Application Publication Nos. 2004/0159903 (Burgener, II et al.), 2004/0196538 (Burgener, II et al.), 2005/0093001 (Liu et al.), and 2005/0094109 (Sun et al.). Anti-Stokes phosphors are also disclosed in European Patent 0143034 (Maestro et al.), which is also incorporated herein by reference. As noted above, the Plasma-tube may be constructed wholly or in part from a down-conversion substance, up-conversion substance or a combination of both.

Quantum Dots

In one embodiment of this invention, the luminescent substance is a quantum dot material. Examples of luminescent quantum dots are disclosed in International Publication Numbers WO 03/038011, WO 00/029617, WO 03/038011, WO 03/100833, and WO 03/037788, all incorporated herein by reference. Luminescent quantum dots are also disclosed in U.S. Pat. Nos. 6,468,808 (Nie et al.), 6,501,091 (Bawendi et al.), 6,698,313 (Park et al.), and U.S. Patent Application Publication 2003/0042850 (Bertram et al.), all incorporated herein by reference. The quantum dots may be added or incorporated into the Plasma-tube during tube formation or after the tube is formed.

Protective Overcoat

In one embodiment, a luminescent substance is located on an external surface of the Plasma-tube. Luminescent phosphors on the exterior tube surface may require a protective overcoat. This protective overcoat may be an inorganic and/or organic substance.

The protective overcoat may comprise a clear or transparent acrylic compound including acrylic solvents, monomers, dimers, trimers, polymers, copolymers, and derivatives thereof to protect the luminescent substance from direct or indirect contact or exposure with environmental conditions such as air, moisture, sunlight, handling, or abuse. The selected acrylic compound is of a viscosity such that it can be conveniently applied by spraying, screen print, ink jet, or other convenient methods so as to form a clear film or coating of the acrylic compound over the luminescent substance.

Other organic compounds may also be suitable as protective overcoats including silanes such as glass resins. Also the polyesters such as Mylar® may be applied as a spray or a sheet fused under vacuum to make it wrinkle free. Polycarbonates may be used but may be subject to UV absorption and detachment.

In one embodiment hereof the luminescent substance is coated with a film or layer of a perylene compound including monomers, dimers, trimers, polymers, copolymers, and derivatives thereof. The perylene compounds are widely used as protective films. Specific compounds including poly-monochloro-para-xylyene (Parylene C) and poly-para-xylylene (Parylene N). Parylene polymer films are also disclosed in U.S. Pat. Nos. 5,879,808 (Wary et al.) and 6,586,048 (Welch et al.), both incorporated herein by reference. The perylene compounds may be applied by ink jet printing, screen printing, spraying, and so forth as disclosed in U.S. Patent Application Publication 2004/0032466 (Deguchi et al.), incorporated herein by reference. Parylene conformal coatings are covered by Mil-I-46058C and ISO 9002. Parylene films may also be induced into fluorescence by an active plasma as disclosed in U.S. Pat. No. 5,139,813 (Yira et al.), incorporated herein by reference. Phosphor overcoats are also disclosed in U.S. Pat. Nos. 4,048,533 (Hinson et al.), 4,315,192 (Skwirut et al.), 5,592,052 (Maya et al.), 5,604,396 (Watanabe et al.), 5,793,158 (Wedding), and 6,099,753 (Yoshimura et al.), all incorporated herein by reference. In some embodiments, the luminescent substance is selected from materials that do not degrade when exposed to oxygen, moisture, sunlight, etc. and that may not require a protective overcoat.

Tinted Plasma-tubes

In the practice of this invention, the Plasma-tube may be color tinted or constructed of materials that are color tinted with red, blue, green, yellow, or like pigments. The gas discharge may also emit color light of different wavelengths. The use of tinted materials and/or gas discharges emitting light of different wavelengths may be used in combination with phosphors and the light emitted from such phosphors. Optical filters may also be used.

Filters

This invention may be practiced in combination with an optical and/or electromagnetic (EMI) filter, screen, and/or shield. It is contemplated that the filter, screen, and/or shield may be positioned on a PDP constructed of Plasma-tubes, for example on the front or top-viewing surface. The Plasma-tubes may also be tinted. Examples of optical filters, screens, and/or shields are disclosed in U.S. Pat. Nos. 3,960,754 (Woodcock), 4,106,857 (Snitzer), 4,303,298, (Yamashita), 5,036,025 (Lin), 5,804,102 (Oi), and 6,333,592 (Sasa et al.), all incorporated herein by reference. Examples of EMI filters, screens, and/or shields are disclosed in U.S. Pat. Nos. 6,188, 174 (Marutsuka) and 6,316,110 (Anzaki et al.), incorporated herein by reference. Color filters may also be used. Examples are disclosed in U.S. Pat. Nos. 3,923,527 (Matsuura et al.), 4,105,577 (Yamashita), 4,110,245 (Yamashita), and 4,615, 989 (Ritze), all incorporated herein by reference.

IR Filters

The Plasma-tube PDP may contain an infrared (IR) filter. An IR filter may be selectively used with one or more Plasma-tubes to absorb or reflect IR emissions from the display. Such IR emissions may come from the gas discharge inside a Plasma-tube and/or from a luminescent substance inside and/or outside of a Plasma-tube. An IR filter is necessary if the display is used in a night vision application such as with night vision goggles. With night vision goggles, it is typically necessary to filter near IR from about 650 nm (nanometers) or higher, generally about 650 nm to about 900 nm. In some embodiments the Plasma-tube may comprise an IR filter material. The Plasma-tube may be made from an IR filter material.

Examples of IR filter materials include cyanine compounds such as phthalocyanine and naphthalocyanine compounds as disclosed in U.S. Pat. Nos. 5,804,102 (Oi et al.), 5,811,923 (Zieba et al.), and 6,297,582 (Hirota et al.), all incorporated herein by reference. The IR compound may also be an organic dye compound such as anthraquinone as disclosed in Hirota et al. ('582) and tetrahedrally coordinated transition metal ions of cobalt and nickel as disclosed in U.S. Pat. No. 7,081,991 (Jones et al.), incorporated herein by reference.

Optical Interference Filter

The filter may comprise an optical interference filter comprising a layer of low refractive index material and a layer of high refractive index material, as disclosed in U.S. Pat. Nos. 4,647,812 (Vriens et al.) and 4,940,636 (Brock et al.), both incorporated herein by reference. In one embodiment, each Plasma-tube is composed of a low refraction index material and a high refraction index material. Examples of low refractive index materials include magnesium fluoride and silicon dioxide such as amorphous $SiO_2$. Examples of high refractive index materials include tantalum oxide and titanium oxide. In one embodiment, the high refractive index material is titanium oxide and at least one metal oxide selected from zirconium oxide, hafnium oxide, tantalum oxide, magnesium oxide, and calcium oxide.

Optimizing Phosphor and Gas

In the prior art, it is necessary to select an ionizable gas mixture and gas pressure that is optimum for all phosphors used in the device such as red, blue, and green phosphors. This requires trade-offs because a particular gas composition may be optimum for a particular green phosphor, but less desirable for red or blue phosphors. In addition, trade-offs are required for the gas pressure. Because the ionizable gas is contained within a multiplicity of tubes, it is possible to provide a custom gas composition at a custom pressure in each tube for each phosphor.

In the practice of this invention, an optimum gas mixture and an optimum gas pressure may be provided for each of the selected phosphors. Thus the gas mixture and gas pressure inside the tubes may be optimized with a custom gas mixture and a custom gas pressure, each or both optimized for each phosphor emitting red, blue, green, white, pink, or yellow light. The tube width and the wall thickness of the tube can also be adjusted and optimized for each phosphor. Depending upon the Paschen Curve (pd v. voltage) for the ionizable gas mixture, the operating voltage may be decreased by optimized changes in the pressure and tube width.

SUMMARY

This invention has been described with reference to a plasma display panel structure having a single substrate or monolithic plasma display panel structure have a one substrate with or without a top or front viewing envelope or dome. Single-substrate or monolithic plasma display panels structures are well known in the prior art and are disclosed by U.S. Pat. Nos. 3,646,384 (Lay), 3,806,846 (Mayer) 3,964,050 (Mayer), and other U.S. patents, all cited above and incorporated herein by reference.

In the practice of this invention, the substrate may be formed from glass, plastic, metal, or any other suitable material. Typically glass or metal substrates have been used to provide a rigid display. In one embodiment hereof there is provided a flexible or bendable display device with a flexible substrate.

For a flexible substrate, the material may be plastic or polymer. Flexible substrates may be formed from Mylar® or Kapton® which are trademark materials marketed by duPont.

In one embodiment of this invention, the tubes may be positioned within a single-substrate or monolithic gas discharge structure that has a flexible or bendable substrate.

The practice of this invention is not limited to flat surface displays. The tubes may be positioned or located on a conformal surface or substrate so as to conform to a predetermined shape such as a curved surface, round shape, or multiple sides.

In the practice of this invention, the tubes may be positioned and spaced in an AC gas discharge plasma display structure so as to utilize and take advantage of the positive column of the gas discharge. The positive column is described in U.S. Pat. No. 6,184,848 (Weber) and is incorporated herein by reference.

The tubes may be sprayed, stamped, pressed, poured, screen-printed, or otherwise applied to a surface. The surface may contain an adhesive or sticky surface.

Aspects of this invention may also be practiced with a coplanar or opposing substrate PDP as disclosed in Wedding ('158) and Shinoda et al. ('500) discussed above.

Although this invention has been disclosed and described above with reference to dot matrix gas discharge displays, it may also be used in an alphanumeric gas discharge display using segmented electrodes. This invention may also be practiced in AC or DC gas discharge displays including hybrid structures of both AC and DC gas discharge.

The tubes may contain a gaseous mixture for a gas discharge display or may contain other substances such as electroluminescent (EL) or liquid crystal materials for practice with other displays technologies including electroluminescent displays (ELD), liquid crystal displays (LCD), field emission displays (FED), electrophoretic displays, vacuum fluorescent displays and organic EL or organic LED (OLED) displays.

The use of tubes on a single flexible substrate allows the encapsulated pixel display device to be utilized in a number of applications. In one application, the device is used as a plasma shield to absorb electromagnetic radiation and to make the shielded object invisible to enemy radar. In this embodiment, a flexible sheet of tubes may be provided as a blanket over the shielded object. The Plasma-tubes may also be used in a radiation detector device. In another embodiment, the Plasma-tubes may be used in an antenna.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. A single substrate positive column gas discharge plasma display device comprising a multiplicity of parallel elongated hollow tubes filled with an ionizable gas positioned on a single substrate, each tube containing at least one column electrode extending along its elongated axis, each tube containing an array of row electrodes that are orthogonal to said at least one column electrode, said array of row electrodes being arranged in pairs, an isolation bar being positioned between each pair of row electrodes, and electronic circuitry electrically connected to said column and row electrodes to provide voltages and cause positive column gas discharge along the elongated axis of the tube between adjacent row electrodes, said isolation bars preventing the spread of the gas discharge.

2. The invention of claim 1 wherein one or more said tubes contains a gas composition that produces photons in the UV, IR, and/or visible range during gas discharge.

3. The invention of claim 2 wherein a luminescent material is located in close proximity to each said tube, said luminescent material emitting light when excited by UV, IR, and/or visible photons from a gas discharge within a said tube.

4. The invention of claim 1 wherein said substrate is of a flexible material.

5. The invention of claim 1 wherein the electronic circuitry provides AC voltages.

6. The invention of claim 1 wherein the electronic circuitry provides DC voltages.

7. The invention of claim 1 wherein said isolation bar is passive.

8. The invention of claim 1 wherein said isolation bar is an active electrode.

9. The invention of claim 1 wherein said tube has an internal surface and an external surface with a luminescent material being located on the internal surface of said tube and/or the external surface of said tube.

10. The invention of claim 1 wherein said tube has an internal and external surface, the internal surface of said tube containing a secondary electron emission material.

* * * * *